(12) United States Patent
Litichever et al.

(10) Patent No.: US 9,881,165 B2
(45) Date of Patent: Jan. 30, 2018

(54) SECURITY SYSTEM AND METHOD FOR PROTECTING A VEHICLE ELECTRONIC SYSTEM

(71) Applicant: ARILOU INFORMATION SECURITY TECHNOLOGIES LTD., Tel Aviv (IL)

(72) Inventors: Gil Litichever, Tel Aviv (IL); Ziv Levi, Nahariya (IL)

(73) Assignee: ARILOU INFORMATION SECURITY TECHNOLOGIES LTD., Ramat-Gan (IL)

(*) Notice: Subject to any disclaimer, the term of this patent is extended or adjusted under 35 U.S.C. 154(b) by 0 days.

(21) Appl. No.: 14/376,827

(22) PCT Filed: Mar. 28, 2013

(86) PCT No.: PCT/IL2013/050290
§ 371 (c)(1),
(2) Date: Aug. 5, 2014

(87) PCT Pub. No.: WO2013/144962
PCT Pub. Date: Oct. 3, 2013

(65) Prior Publication Data
US 2015/0020152 A1 Jan. 15, 2015

Related U.S. Application Data

(60) Provisional application No. 61/617,188, filed on Mar. 29, 2012.

(51) Int. Cl.
*H04L 12/40* (2006.01)
*H04L 29/06* (2006.01)
(Continued)

(52) U.S. Cl.
CPC ........ *G06F 21/604* (2013.01); *G06F 21/6218* (2013.01); *H04L 63/14* (2013.01); *H04L 63/1458* (2013.01); *H04L 2012/40215* (2013.01)

(58) Field of Classification Search
CPC ........... H04L 67/12; H04L 2012/40273; H04L 12/4625; H04L 63/08; H04L 63/14;
(Continued)

(56) References Cited

U.S. PATENT DOCUMENTS

| 5,708,712 A | 1/1998 | Brinkmeyer et al. |
| 5,729,755 A * | 3/1998 | Turski ............... B82Y 15/00 455/307 |

(Continued)

FOREIGN PATENT DOCUMENTS

| EP | 1309132 A1 | 5/2003 | |
| KR | 101191547 B1 * | 10/2012 | ............. H04L 12/66 |
| WO | 0009363 A1 | 2/2000 | |

OTHER PUBLICATIONS

Groll, André, and Christoph Ruland. "Secure and authentic communication on existing in-vehicle networks." Intelligent Vehicles Symposium, 2009 IEEE. IEEE, 2009.*
(Continued)

*Primary Examiner* — Michael Simitoski
(74) *Attorney, Agent, or Firm* — May Patents Ltd.

(57) ABSTRACT

Security system for protecting a vehicle electronic system by selectively intervening in the communications path in order to prevent the arrival of malicious messages at ECUs, in particular at the safety critical ECUs. The security system includes a filter which prevents illegal messages sent by any system or device communicating over a vehicle communications bus from reaching their destination. The filter may, at its discretion according to preconfigured rules, send messages as is, block messages, change the content of the
(Continued)

messages, request authentication or limit the rate such messages can be delivered, by buffering the messages and sending them only in preconfigured intervals.

70 Claims, 25 Drawing Sheets

(51) Int. Cl.
*G06F 21/60* (2013.01)
*G06F 21/62* (2013.01)

(58) Field of Classification Search
CPC ....... H04L 63/1458; H04L 2012/40215; H04L 12/40006; H04L 2209/84; H04L 9/3247; H04L 12/40; H04L 41/0893; H04L 12/40032; H04L 12/585; H04L 12/5855; H04L 29/06578; H04L 63/0281; H04L 63/10; H04L 63/126; H04L 9/3271; G06F 11/3476; G06F 21/44; G06F 21/604; G06F 21/6218; G06F 21/73; G06F 21/85; G06F 2221/2103; B60R 25/209
See application file for complete search history.

(56) References Cited

U.S. PATENT DOCUMENTS

| | | | | |
|---|---|---|---|---|
| 6,092,191 | A * | 7/2000 | Shimbo | H04L 63/0428 380/258 |
| 6,111,888 | A * | 8/2000 | Green | H04J 3/0652 370/447 |
| 6,314,351 | B1 * | 11/2001 | Chutorash | B60R 25/00 307/10.1 |
| 6,496,885 | B1 * | 12/2002 | Smart | H04L 29/06 710/100 |
| 7,356,832 | B1 * | 4/2008 | Eibach | B60R 25/00 701/31.4 |
| 7,917,261 | B2 * | 3/2011 | Melman | B60T 8/885 307/10.3 |
| 7,983,820 | B2 * | 7/2011 | Kelly | H04L 67/2823 701/31.5 |
| 8,139,493 | B2 * | 3/2012 | Kato | H04L 12/4625 370/241 |
| 8,155,868 | B1 * | 4/2012 | Xing | G07C 5/0808 340/439 |
| 8,817,706 | B2 * | 8/2014 | Ichihara | H04L 12/6418 370/328 |
| 8,848,608 | B1 * | 9/2014 | Addepalli | H04W 4/046 370/328 |
| 8,909,418 | B2 * | 12/2014 | Siefermann | H04L 12/24 370/254 |
| 9,031,073 | B2 * | 5/2015 | Yousefi | H04N 7/183 370/392 |
| 9,286,485 | B2 * | 3/2016 | Kotani | G06F 21/31 |
| 9,419,802 | B2 * | 8/2016 | Lortz | G06F 15/177 |
| 2002/0110146 | A1 * | 8/2002 | Thayer | G07C 5/008 370/465 |
| 2002/0147865 | A1 * | 10/2002 | Fujita | G06F 13/28 710/22 |
| 2003/0009271 | A1 * | 1/2003 | Akiyama | G06F 21/335 701/29.6 |
| 2003/0051061 | A1 * | 3/2003 | Hank | H04L 12/40032 709/250 |
| 2003/0065953 | A1 * | 4/2003 | Lehmann | H04L 63/0281 726/12 |
| 2003/0117298 | A1 * | 6/2003 | Tokunaga | B60R 16/0315 340/989 |
| 2003/0228005 | A1 * | 12/2003 | Melick | H04B 1/7172 379/93.01 |
| 2004/0003252 | A1 * | 1/2004 | Dabbish | B60R 25/04 713/175 |
| 2004/0150509 | A1 | 8/2004 | Dunn et al. | |
| 2004/0167689 | A1 * | 8/2004 | Bromley | G07C 5/0808 701/29.6 |
| 2004/0185842 | A1 * | 9/2004 | Spaur | B60R 25/04 455/420 |
| 2005/0151619 | A1 * | 7/2005 | Forest | B60R 25/04 340/5.26 |
| 2005/0188114 | A1 * | 8/2005 | Williams | H04L 69/22 709/250 |
| 2005/0254518 | A1 * | 11/2005 | Fujimori | H04L 69/08 370/466 |
| 2006/0010356 | A1 * | 1/2006 | Snyder | G06F 11/0739 714/56 |
| 2006/0023734 | A1 * | 2/2006 | Yanagida | H04B 3/548 370/438 |
| 2006/0093144 | A1 | 5/2006 | Reinelt | |
| 2006/0115085 | A1 * | 6/2006 | Iwamura | H04L 9/0822 380/259 |
| 2006/0161984 | A1 * | 7/2006 | Phillips | G06F 21/564 726/24 |
| 2006/0171410 | A1 * | 8/2006 | Jung | H04L 12/40143 370/447 |
| 2006/0265486 | A1 * | 11/2006 | Killian | G06F 21/56 709/223 |
| 2007/0050529 | A1 * | 3/2007 | Sakane | B60R 16/0207 710/300 |
| 2007/0118752 | A1 * | 5/2007 | Kiessling | G06F 21/305 713/176 |
| 2007/0180225 | A1 * | 8/2007 | Schmidt | H04L 9/321 713/152 |
| 2008/0056487 | A1 * | 3/2008 | Akyol | H04L 63/0428 380/2 |
| 2008/0059806 | A1 * | 3/2008 | Kishida | G06F 21/35 713/186 |
| 2008/0092227 | A1 | 4/2008 | Eibach | |
| 2008/0167758 | A1 * | 7/2008 | Louch | H04L 12/66 701/2 |
| 2008/0192929 | A1 | 8/2008 | Knechtel et al. | |
| 2008/0219274 | A1 * | 9/2008 | Kato | H04L 12/4625 370/401 |
| 2009/0070442 | A1 * | 3/2009 | Kacin | H04L 63/029 709/221 |
| 2009/0082912 | A1 * | 3/2009 | Melman | B60T 8/885 701/1 |
| 2009/0089248 | A1 * | 4/2009 | Alexander | G06F 17/30899 |
| 2009/0172102 | A1 * | 7/2009 | Chesnutt | H04L 12/585 709/206 |
| 2009/0288175 | A1 | 11/2009 | Sun et al. | |
| 2010/0165878 | A1 | 7/2010 | Soni | |
| 2010/0174439 | A1 | 7/2010 | Petricoin, Jr. et al. | |
| 2010/0205429 | A1 * | 8/2010 | Alrabady | H04L 63/0823 713/156 |
| 2010/0299466 | A1 * | 11/2010 | Asano | H04L 12/40013 710/105 |
| 2011/0047630 | A1 * | 2/2011 | Cheng | H04L 9/3234 726/34 |
| 2011/0083161 | A1 * | 4/2011 | Ishida | H04L 12/40 726/2 |
| 2011/0093639 | A1 | 4/2011 | Richards | |
| 2011/0113107 | A1 * | 5/2011 | Hartwich | H04L 12/40032 709/206 |
| 2011/0245935 | A1 * | 10/2011 | Katou | G05B 9/03 700/21 |
| 2012/0106551 | A1 * | 5/2012 | Yousefi | H04N 7/183 370/392 |
| 2012/0158240 | A1 * | 6/2012 | Downs, Jr. | H04L 67/12 701/30.1 |
| 2012/0266230 | A1 * | 10/2012 | Vanderpol | H04L 63/0227 726/11 |
| 2012/0311690 | A1 * | 12/2012 | Ellis | G06F 21/50 726/11 |
| 2013/0104231 | A1 * | 4/2013 | Niner | H04L 63/1466 726/23 |
| 2013/0185766 | A1 * | 7/2013 | Fujiki | H04L 63/08 726/3 |
| 2013/0219170 | A1 * | 8/2013 | Naitou | H04L 63/0428 713/153 |

(56) References Cited

U.S. PATENT DOCUMENTS

| | | | | |
|---|---|---|---|---|
| 2013/0227650 | A1* | 8/2013 | Miyake | G05B 23/02 726/3 |
| 2014/0040992 | A1* | 2/2014 | Koide | H04L 9/3242 726/4 |
| 2014/0195808 | A1* | 7/2014 | Lortz | G06F 15/177 713/170 |
| 2014/0226673 | A1* | 8/2014 | Hirashima | H04L 12/40006 370/401 |
| 2014/0297110 | A1* | 10/2014 | Noda | H04L 12/40006 701/36 |
| 2014/0328352 | A1* | 11/2014 | Mabuchi | H04L 12/4035 370/451 |

OTHER PUBLICATIONS

Amirtahmasebi, Kasra, and Seyed Reza Jalalinia. "Vehicular Networks—Security, Vulnerabilities and Countermeasures." (2010).*
Bouard, Alexandre, et al. "Automotive proxy-based security architecture for ce device integration." Mobile Wireless Middleware, Operating Systems, and Applications. Springer Berlin Heidelberg, 2012. 62-76.*
Nilsson, Dennis K., Ulf E. Larson, and Erland Jonsson. "Efficient in-vehicle delayed data authentication based on compound message authentication codes." Vehicular Technology Conference, 2008. VTC 2008-Fall. IEEE 68th. IEEE, 2008.*
Wolf, Marko, André Weimerskirch, and Christof Paar. "Secure in-vehicle communication." Embedded Security in Cars. Springer Berlin Heidelberg, 2006. 95-109.*
Bouard, Alexandre, et al. "Automotive proxy-based security architecture for ce device integration." International Conference on Mobile Wireless Middleware, Operating Systems, and Applications. Springer Berlin Heidelberg, 2012.*
Schweppe, Hendrik, et al. "Securing car2X applications with effective hardware software codesign for vehicular on-board networks." VDI Automotive Security 27 (2011).*
International Search Report issued in PCT/IL2013/050290 dated Jul. 18, 2013 (3 pages).
International Preliminary Report on Patentability (IPRP) issued in PCT/IL2013/050290 dated Oct. 1, 2014.
Checkoway et al., "Comprehensive Experimental Analysis of Automotive Attack Surfaces", SEC'11 Proceedings of the 20th USENIX conference on Security, Aug. 8, 2011:16 pages. accessed online at http://www.autosec.org/pubs/cars-usenixsec2011.pdf.
Koscher et al., "Experimental Security Analysis of a Modern Automobile", IEEE Symposium on Security and Privacy, Oakland, CA, May 16, 2010:1-16. accessed online at http://www.autosec.org/publications.html
Hamilton et al., "Side Channel Analysis of an Automotive Microprocessor", IET Irish Signals and Systems Conference, Jun. 18-19, 2008:6 pages.

* cited by examiner

FIREWALL – OF THE ART

TIMING RULE LOGIC

SECURITY SYSTEM AND METHOD FOR PROTECTING A VEHICLE ELECTRONIC SYSTEM

CROSS-REFERENCE TO RELATED APPLICATIONS

The present invention is filed under 35 U.S.C. §371 as the United States national phase of International Application No. PCT/IB2013/050290, filed Mar. 28, 2013, which designated the United States and claims priority to U.S. Provisional Application No. 61/617,188 filed Mar. 29, 2012, which is hereby incorporated in its entirety including all tables, figures, and claims.

TECHNICAL FIELD

The present invention relates to security systems and methods in general, and in particular to protecting a vehicle's electronic system or industrial control systems from cyber threats.

DEFINITIONS AND BACKGROUND ART

Definitions, Terms, Elements

Electronic Control Unit

The term "Electronic Control Unit" (ECU) denotes herein any electronic system within a vehicle with processing capabilities (e.g. a radio system is an ECU while a wiper controlled by a relay is not). An electronic control unit is a type of electronic component within a vehicle electronic system.

Some ECUs include an external communication interface, i.e. an interface to communicate with components outside the vehicle's electronic system including outside the vehicle itself. ECU also stands for "Engine Control Unit" which is a special case of an Electronic Control Unit.

Bus

A bus (also referred to as communications bus) is a shared wired or wireless communication channel over which different components transfer data from one to another.

Controller Area Network Bus

Controller Area Network (CAN or CAN bus) is a vehicle bus standard designed to allow electronic systems to communicate with each other within a vehicle without a host computer (no master required on the bus). ECUs in a vehicle usually communicate by accessing a CAN bus. CAN bus is also used in systems that are not a vehicle, such as Industrial Control Systems, and the invention encompasses uses of CAN bus or any similar bus in any system. For simplifying the description, most examples will refer to CAN bus and a vehicle.

Filter Element

Filter element denotes an element with two interfaces that upon receiving a message either discards it, changes it or passes it according to various conditions e.g. message ID value. The filter element is the part of the security system of the invention which is in charge of the logic of the filtering, e.g. classifying, analyzing and acting upon the messages received. The filter element can be either a hardware module, a software module, or a hardware and software module. The filter element may contain an additional logic module for supporting more actions, such as generating messages itself, maintaining an inner state, or any other action.

Proxy Element

The term proxy element as referred to herein denotes an element with at least one communication interface that holds the current state according to past communication. The proxy element can send messages to its interface(s) according to its current state, the current input (e.g. a message) and the time (e.g. an independent process that sends keep-alive messages periodically). This element is usually used to allow two parties to communicate with each other indirectly.

Attack Vectors

An attack vector is a path or means by which an attacker can gain access to a computerized device in order to deliver a payload which will cause a malicious outcome. An automobile has numerous attack vectors, including supply chain, physical access to the automotive communication bus, physically replacing one of the vehicle's ECUs, using one of the ECUs' standard connections to the external world etc.

The disclosure assumes that most of the threats originate from ECU's connections to the external world. The disclosure assumes each of the ECUs, except the suggested security system (or device), is potentially vulnerable to attacks that might execute malicious code on it and may gain control over it. The attack on each ECU may be achieved using any of its data connections (physical or wireless).

Security System

Security system denotes a system (that may be implemented also as a device) for protecting an electronic component or bus within a vehicle electronic system or other industrial control system, embodiments of which are described in this disclosure. In some embodiments the security system is a stand-alone system as described in the STAND-ALONE SYSTEM and the GATEWAY SYSTEM sections. In some embodiments the security system is integrated inside another system as described in the INTEGRATED SYSTEM section. The security system can also be denoted by "communication filter/proxy".

BACKGROUND

Hacking Threat

Automobiles are becoming more sophisticated and increasingly use computerized technology (ECU—electronic control unit) to control critical functions and components such as brakes and airbags functionality. While the computerized technology enhances the performance of the vehicle, compromising the operation of one of these safety-critical ECUs may cause severe damage to the vehicle, its passengers and potentially even the surroundings if the vehicle is involved in an accident with other vehicle(s) or pedestrians.

These ECUs are usually connected via a non-secure manner such as through CAN bus. Taking control of the vehicle's communication bus can result in 20 compromising the safety critical ECUs (see "Experimental Security Analysis of a Modern Automobile" by Koscher et al., 2010 IEEE Symposium on Security and Privacy).

Some of the ECUs which are connected to the vehicle's communication bus have external connections, such as the telematics computer and the infotainment 25 system. It is possible to compromise one of these ECUs using a cyber-attack. The compromised ECU serves as an entry point to deploy the aforementioned attack, see "Comprehensive Experimental Analyses of Automotive Attack Surfaces", Checkoway et al., USENIX Security, Aug. 10-12, 2011.

FIG. 1 and FIG. 2 present a simple vehicle's communication network of the art consisting of a single bus.

FIG. 1 shows a vehicle electronic system 101 comprising a plurality of ECU's 75 connected to a vehicle communication bus 105. The ECU's 75 communicate with each other over the communication bus 105. A vehicle electronic system 101 may contain multiple communication buses 105, each connected to one or more ECU's 75.

FIG. 2 displays a more detailed view of a vehicle electronic system 101 comprising a plurality of ECU's with external connections 104, safety critical ECU's 100 and other ECU's 106 (without external connection and non-safety critical).

ECU's with external connections 104 include (but are not limited to) telematics 102, infotainment system 112, Tire Pressure Monitoring System (TPMS) 113, vehicle to vehicle (V2V) or vehicle to infrastructure (V2I) communication ECU 114 and any combination of ECUs with an external connection not specifically mentioned 109.

Safety critical ECU's 100 include (but are not limited to) the engine control unit 108, brake control module (ABS/ESC etc.) 115, airbag control unit (ACU) 116, transmission control unit (TCU) 117, and any combination of safety critical ECUs not specifically mentioned 110.

Other ECU's 106 denote the set of ECUs that do not have an external connection and are not safety critical, which include the convenience control unit (CCU) 118 and any combination of ECUs which fall under this category but are not specifically mentioned 111. All the ECUs 75 communicate using the same shared communication bus 105. There is an external connection to the electronic system 101 using the telematics ECU 102. The telematics ECU 102 communicates using the illustrated wireless connection 202 with a wireless transceiver 201.

A vehicle electronic system 101 can be attacked where an external communication source (transceiver) 201 establishes a communication line 202 to an ECU, in this example the Telematics ECU 102.

Vehicle theft using CAN bus manipulation becomes more and more popular.

Another financial threat that worries OEMs and Tier-1 suppliers is unauthorized ECU 75 replacement. The owner of a vehicle may replace an existing ECU 75 with an unauthentic/unoriginal one, for several reasons:

The ECU 75 needed to be replaced for maintenance reasons and the unauthorized replacement is cheaper (the vehicle owner may or may not be aware that the ECU 75 is not authentic); or The replacement gives the vehicle more capabilities similarly to chip tuning (e.g. remove limitations from the engine giving more horsepower—although it is not in the engine's specification making it more prone to malfunction and/or making it unsafe).

The damage to the OEMs and Tier-1 suppliers is both because their original equipment isn't bought, and because the unauthorized replacement might damage the vehicle which is still under warranty which they have to cover.

Vehicle's Communication Bus

A vehicle's communication bus 105 is an internal communication network that interconnects components inside a vehicle. Examples of protocols include CAN, Local Interconnect Network (LIN), FlexRay, Vehicle Area Network (VAN) and others.

FIG. 1 and FIG. 2 present a simple vehicle's electronic system of the art consisting of a single bus.

FIG. 3 and FIG. 4 present a vehicle's electronic system of the art consisting of several buses 105 or bus segments 105. Each bus segment 105 may consist of a different type of communication protocol or of the same communication protocol but possibly with a different configuration.

FIG. 3 illustrates an example of a vehicle's internal electronic system, comprising of several ECUs 102, 112 and 75 connected to a slow communication bus 301 and several ECUs 117, 116, 115, 113, 108 and 75 connected to a fast communication bus 305. A bridge or a gateway 302 connects the two buses 301 and 305.

FIG. 4 is a more general example of the vehicle's internal electronic system 101 illustrated in FIG. 3, where three communication busses 105 are connected by a gateway or bridge 302. Each communication bus 105 has a set of ECUs 75 connected to it.

CAN Bus Gateway/Bridge

A gateway or bridge 302 connects several bus segments 105 and allows messages to pass between them. A bridge 302 is described, for example, in U.S. Pat. No. 6,292,862 entitled "BRIDGE MODULE". A gateway 302 is described, for example, in US Patent Application No. 2009/0198856, entitled "GATEWAY FOR DATA BUS SYSTEM".

Gateways and bridges 302 are designed to transfer messages between bus segments 105 in a reliable manner but are not designed from a cyber-security perspective. One perspective of cyber-security-directed design, as opposed to reliability-directed design, is message filtering. Usually a bridge or a gateway 302 will not discard messages out of the concern that these messages will be needed and their absence will cause harm. Some gateway 302 designs exhibit monitoring abilities of selected messages such the one described in US Patent Application No. 2009/0198856. When monitoring the communications, selected messages are sent to a monitoring interface (described below). The selective monitoring is often referred to as filtering; however this type of filtering does not interfere with the original communication.

CAN Bus Monitoring

A monitor is a device delivering messages being sent on a bus 105 (or their properties) to a diagnostic device. A monitor is either a standalone device or a module/part in another device such as a gateway 302. A standalone monitor is described in US Patent Application No. 2006/0182040, entitled "DEVICE AND METHOD FOR DIAGNOSIS ON MULTI-CHANNEL-CAN-APPLICATION". Some of these monitors selectively monitor messages but do not intervene with the communication on the bus 105.

Bus Encryption

Encryption is a common method to address authentication problems. Encryption methods for CAN bus 105 are described in US Patent Application No. 2011/0093639, entitled "SECURE COMMUNICATIONS BETWEEN AND VERIFICATION OF AUTHORIZED CAN DEVICES" and US Patent Application No. 2009/0169007, entitled "CONTROL AREA NETWORK DATA ENCRYPTION SYSTEM AND METHOD".

While encryption can be the basis for authentication, from a system perspective it is not a viable solution for the automotive environment. The automotive environment consists of many vendors and devices. These devices are usually simple and have little processing power.

For an effective encryption scheme, either a key exchange or specific preloaded keys are required. These are quite complicated processes given the limitations of the automotive industry and the devices described above.

The CAN bus 105 is usually quite slow and encryption demands additional bandwidth which may slow down the communication even further, and could impact overall system performance.

Firewall

FIG. 5 is a schematic drawing of a Firewall integration of the art. A firewall is a device, or set of devices, designed to permit or deny network transmissions based upon a set of rules and is frequently used to protect networks from unauthorized access while permitting legitimate communications to pass.

FIG. 5 illustrates two networks A and B 501 separated by a firewall 503. Each network 501 has at least one computer 500 connected to it.

A firewall 503 is usually designed for Internet Protocol (IP)-based networks 501 and uses the IP and Transmission Control Protocol (TCP) characteristics of the communication. Currently, there are no firewalls 503 intended for CAN bus 105. CAN messages differ from IP messages in many aspects such as size, headers, content etc.

The assumptions of IT firewall 503 designers differ from the assumptions required in designing a protection for a safety critical system. A false positive or a false negative identification of a message in the IT arena usually does not have a direct physical impact (unlike the industrial control systems (ICS) arena where computers control physical processes such as temperature, pressure, engines etc.). An automotive involves human lives and ECUs 75 directly influence the automobile's functionality; therefore a traditional firewall 503 is not applicable in this case.

Firewall 503 implementation for a native CAN BUS communication bus 105 does not exist. In general, Industrial Control Systems (ICS) security solutions lack filters and firewalls 503 and usually exhibit a diode (one way communication) and network separation solution. These solutions are not viable for an automotive since an automotive requires two-way communications.

SUMMARY OF INVENTION

It is an object of the present invention to provide a security system.

It is another object of the present invention to provide a security system to protect an electronic system against malicious messages.

It is a further object of the present invention to provide a security system to protect an electronic system of a vehicle against malicious messages.

It is yet another object of the present invention to provide a security system to protect an electronic system of any transportation means against malicious messages.

It is yet a further object of the present invention to provide a security system to protect an industrial control system against malicious messages.

It is yet another object of the present invention to provide a security system to protect any electronic system comprising a CAN Bus against malicious messages.

The present invention relates to a security system by which computer-based equipment, information and services are protected from unintended or unauthorized access, change, malfunction or destruction.

The present invention thus relates to a security system for protecting a vehicle electronic system from malicious messages, comprising:

(i) one or more message receiving units, each message receiving unit connected to one or more communication buses via one or more ports, for receiving all messages sent from a source communication bus to a destination communication bus, prior to their arrival to said destination bus;

(ii) one or more message classification units which receive messages from the one or more message receiving units and classify them according to the port upon which the message was received, and according to at least one message property;

(iii) one or more message analyzer units which analyze a message according to its classification from the one or more message classification units and decide whether to transfer the message to the appropriate transmission unit as is, block the message or perform at least one of the following actions: (1) transfer a modified version of the message to the appropriate transmission unit; (2) limit the rate that such messages can be delivered to the appropriate transmission unit to predetermined value per time unit; (3) add a signature to the message and transfer it to the appropriate transmission unit; (4) verify that the message has arrived with a valid signature as a condition to transfer to its appropriate transmission unit; or (5) transfer the message to the appropriate transmission unit only after performing an authentication procedure; and (iv) one or more message transmission units which receive from the one or more message analyzer units messages to be transmitted to a destination bus, and transmit said messages to the destination bus.

In some embodiments, the vehicle is a car, a truck, a motorcycle, a train, a tank, an airplane, a missile, a spaceship, a rocket or a robot.

In some embodiments, the malicious messages are valid messages that are sent in high volume in order to saturate a system resource and make it unavailable or slow to respond to legitimate messages.

In some embodiments, the source communication bus and the destination communication bus are the same communication bus.

In some embodiments, the system comprises at least two bus interfaces and can filter messages in each direction, from any communication bus to any communication bus.

In some embodiments, the one or more message analyzer units and the one or more message classification units are replaced by a proxy.

In some embodiments, the at least one message property comprises message ID, a message data field, or the message length.

In some embodiments, the at least one bus is a CAN BUS.

In some embodiments, the modified version of the message to its destination bus is an encrypted message or a message with an addition of a signature. Alternatively, a modified message can be both encrypted and with a signature.

In some embodiments, the message analyzer unit applies more than one rule on a received message.

In some embodiments, the system activities are logged for statistics purposes.

In some embodiments, the system is integrated with an ECU or a stand-alone system coupled to at least one ECU or a stand-alone system not coupled to any ECU.

In some embodiments, the security system is used for preventing vehicle theft, chip tuning or any unauthorized intervention in the vehicle operation.

In some embodiments, a plurality of ECU's with external connections are protected by said security system.

In some embodiments, all ECU's with external connections are protected by said security system.

In some embodiments, at least one security system is placed on the communication path between at least one ECU with an external connection and at least one safety critical ECU.

In some embodiments, a security system is placed on the communication path between each ECU with an external connection and each safety critical ECU.

In another aspect, the present invention further relates to a security system for protecting an industrial control system's electronic system from malicious messages, comprising:

(i) one or more message receiving units, each message receiving unit connected to one or more communication buses via one or more ports, for receiving all messages sent from a source communication bus to a destination communication bus, prior to their arrival to said destination communication bus;

(ii) one or more message classification units which receive messages from the one or more message receiving units and classify them according to the port upon which the message was received, and according to at least one message property;

(iii) one or more message analyzer units which analyze a message according to its classification from the one or more message classification units and decide whether to transfer the message to appropriate transmission unit as is, block the message or perform at least one of the following actions: (1) transfer a modified version of the message to the appropriate transmission unit; (2) limit the rate that such messages can be delivered to the appropriate transmission unit to predetermined value per time unit; (3) add a signature to the message and transfer it to the appropriate transmission unit; (4) verify that the message has arrived with a valid signature as a condition to transfer it to the appropriate transmission unit; or (5) transfer the message to the appropriate transmission unit only after performing an authentication procedure;

(iv) one or more message transmission units which receive from the one or more message analyzer units messages to be transmitted to a destination bus, and transmit said messages to the destination bus.

In some embodiments, at least one bus is a MODBUS, MIL-STD-1553 or MIL-STD-1773 ARINC.

In yet another aspect, the present invention relates to a security method for protecting a vehicle electronic system from malicious messages, comprising:

(i) intercepting messages sent from a source communication bus to a destination communication bus via one or more ports, prior to their arrival to said destination communication bus;

(ii) classifying said messages according to the port upon which the message was received, and according to at least one message property;

(iii) analyzing said messages according to their classification and deciding whether to transfer the message to its destination communication bus as is, block the message or perform at least one of the following actions: (1) transfer a modified version of the message to its destination communication bus; (2) limit the rate that such messages can be transferred to a destination communication bus to predetermined value per time unit; (3) add a signature to the message and transfer it to its destination communication bus; (4) verify that the message has arrived with a valid signature as a condition to transfer to its destination communication bus; or (5) transfer the message to its destination communication bus only after performing an authentication procedure;

(iv) transmitting messages to their destination communication bus based on the analysis of step (iii).

MODES FOR CARRYING OUT THE INVENTION

Figure 1:
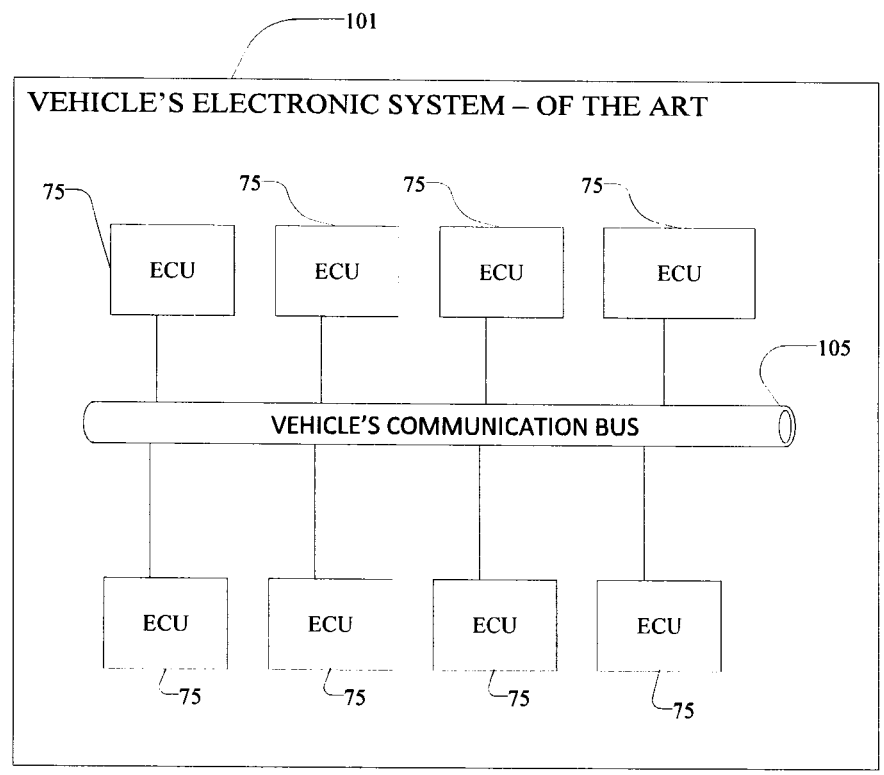
FIG. 1 illustrates an example of a vehicle's electronic system of the art, comprising of ECUs and a communication bus.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The figures described herein illustrate blocks. Each block can represent any combination of hardware, software and/or firmware which performs the functions as defined and explained herein.

Modern vehicles increasingly use more efficient computerized, electronic components and sub-systems instead of mechanical parts. Such systems are controlled by ECUs 75, which are connected through one or more communication buses 105. In case that more than one communication bus 105 exists, the buses 105 are usually connected using bridges or gateways 302. Some of these ECUs 75 controlled systems are safety critical systems 100, such as the engine control unit 108 or the brake control module 115, and some are less critical or non-critical systems, such as infotainment systems 112 and wireless tire pressure sensors 113. Some of the systems mentioned above are ECU's with external interfaces 104, for example, the tire pressure sensors 113 communicate wirelessly with a receiver on the bus 105, the radio 112 has wireless (radio, Radio Data System (RDS), etc.) and local (e.g. media files) interfaces and the telematics 102 (e.g. On-Star™) has a cellular interface 202.

Though these interconnected computerized systems 75 offer the user increased performance of the vehicle and additional services, there is an inherit danger in such architecture wherein anyone who gets access to a communication bus 105 of the vehicle may maliciously interfere with the proper operation of the systems 75 communicating over the bus 105, among them the safety critical systems 100. There are many ways such attacks can be accomplished once access is gained to a communication bus 105. Some examples include: attacking any system 75 directly; sending messages constantly over the bus 105 preventing others from communicating (denial of service); impersonating to other devices 75 sending false messages; sending messages that will have a harmful effect (press the brakes, disable the Anti-Lock Braking System 115, etc.); sending messages to limit the functionality of a part 75 (limit speed etc.), etc. In today's vehicle architecture, there is no secured isolation between the safety critical systems 100 and the other systems 104 and 106.

Some embodiments of the present invention relate to a cyber-security-directed design which selectively intervenes in the communication path in order to prevent the arrival of malicious messages at ECUs 75 (in particular at the safety critical ECUs 100). The security perspective suggests that more damage can be caused by passing a potentially unwanted message than by blocking or changing it. However, there may be reliability implications. In a cyber-security-directed design, reliability issues can be solved using methods described herein.

In some embodiments, the security system of the invention includes a filter which prevents illegal messages sent by any system or device 75 communicating over the communications bus 105 from reaching their destination. The filter of the invention may, at its discretion according to preconfigured rules, change the content of the messages or limit the rate such messages can be delivered, by buffering the messages and sending them only in preconfigured intervals. The rules in the filter of the invention, which determine which messages are allowed and which are not allowed and the rate of the messages, can be configured using an external interface of the filter. The security system can be located, for example, between each system component which has an external interface 109 and the communication bus 105, protecting the bus 105 and the electronic devices 75 connected to it from the component 109.

In some embodiments, the security system of the invention has at least two bus 105 interfaces and can filter messages in each direction. The filtering is done in any appropriate way, for instance, according to the message's properties (such as message headers, data, etc.) and/or according to inner state properties of the security system (such as the physical interface through which the message was sent, the timings, etc.) or any combination of the above.

In some embodiments, the security system has proxy capabilities. A proxy saves the state of the communication protocols over one or more of its physical interfaces. It also independently manages the communication protocol over each of its interfaces (such as sending keep-alive messages to the radio without involving other components 75).

In some embodiments, the security system has gateway 302 capabilities. It can connect two or more communication buses 105 which may have different physical properties.

In some embodiments, the security system can save its configurations in a non-volatile memory, and the configurations and the non-volatile memory may be updated from an external source.

In some embodiments, the security system may save statistics, monitoring data etc. internally for later usage, for example, when such data is read externally later.

In some embodiments, the security system can internally update the non-volatile memory contents.

In some embodiments, the security system can be integrated inside current ECUs 75, between the physical driver and the logical part of the ECU 75, saving the need for additional physical interfaces for the security system. In other embodiments, the security system can be a stand-alone security system. The stand-alone security system of the invention can be coupled to a single ECU 75, coupled to a plurality of ECU's 75 or not coupled to any ECU 75.

In some embodiments, the security system can be integrated into a system containing one or more communication buses 105 and ECUs 75. It can learn the communication properties of the different parts 75 of the system, build filtering rules in an autonomic fashion, and filter when the learning phase is over.

Some embodiments may include a combination of any of the aforementioned embodiments.

Other aspects of the currently disclosed subject matter will become apparent by consideration of the detailed description and the accompanying drawings.

System Integration and Placement

There are several potential embodiments of the invention from a system integration point of view. In some embodiments, the security system will act as a protection system or device between at least two communication buses 105 or components 75.

Attacking an automobile (without physically tampering or pre-installing a backdoor) requires logical access to its electronic components 75. The suggested integration positions of the security system of the invention, according to some embodiments, prevent an improper logical access originating from external interfaces 202 from reaching safety critical components 100. Therefore, the integration of the security system can protect from life threatening cyber-attacks. Assuming the security system is configured correctly, a potentially hermetic protection is achieved.

In some embodiments, when dealing with chip tuning, unauthorized ECU 75 replacement and vehicle theft, the security system of the invention can be coupled with ECUs 75 that need to be protected and/or authenticated (e.g. antitheft ECU 75, immobilizer 110, engine control unit 108, etc.)

If the security system has a configuration port, in some embodiments the configuration port will not be connected to any untrusted communication buses 105.

In some embodiments, the configuration port can be connected in-band, i.e. to one or more of the communication buses 105, given it is protected in some manner. In some embodiments, this in-band configuration is optional and can be disabled after the initial configuration stage (e.g. during vehicle manufacturing or assembly) is completed. In some embodiments, special configuration messages sent over the communication bus 105, will be transferred to the configuration interface for processing, and will cause a change in the configuration.

Standalone Device

Figure 2:
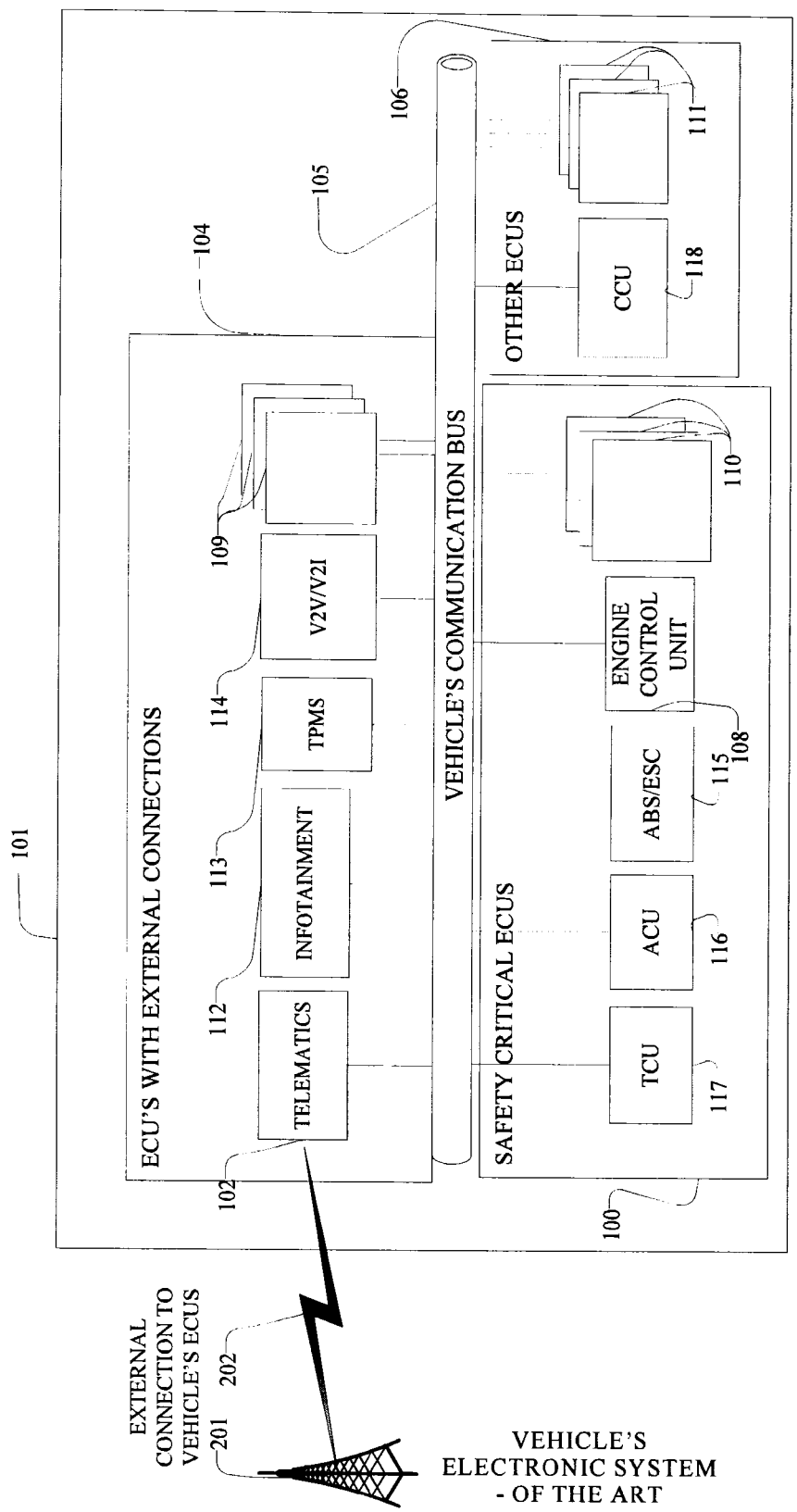
FIG. 2 illustrates a more detailed example of a vehicle's electronic system of the art, comprising of ECUs with external communications, safety critical ECU's and other ECU's, all ECU's connected to a communication bus. An external connection is established to the electronic system from an external communication source to the telematics ECU.
Figure 3:
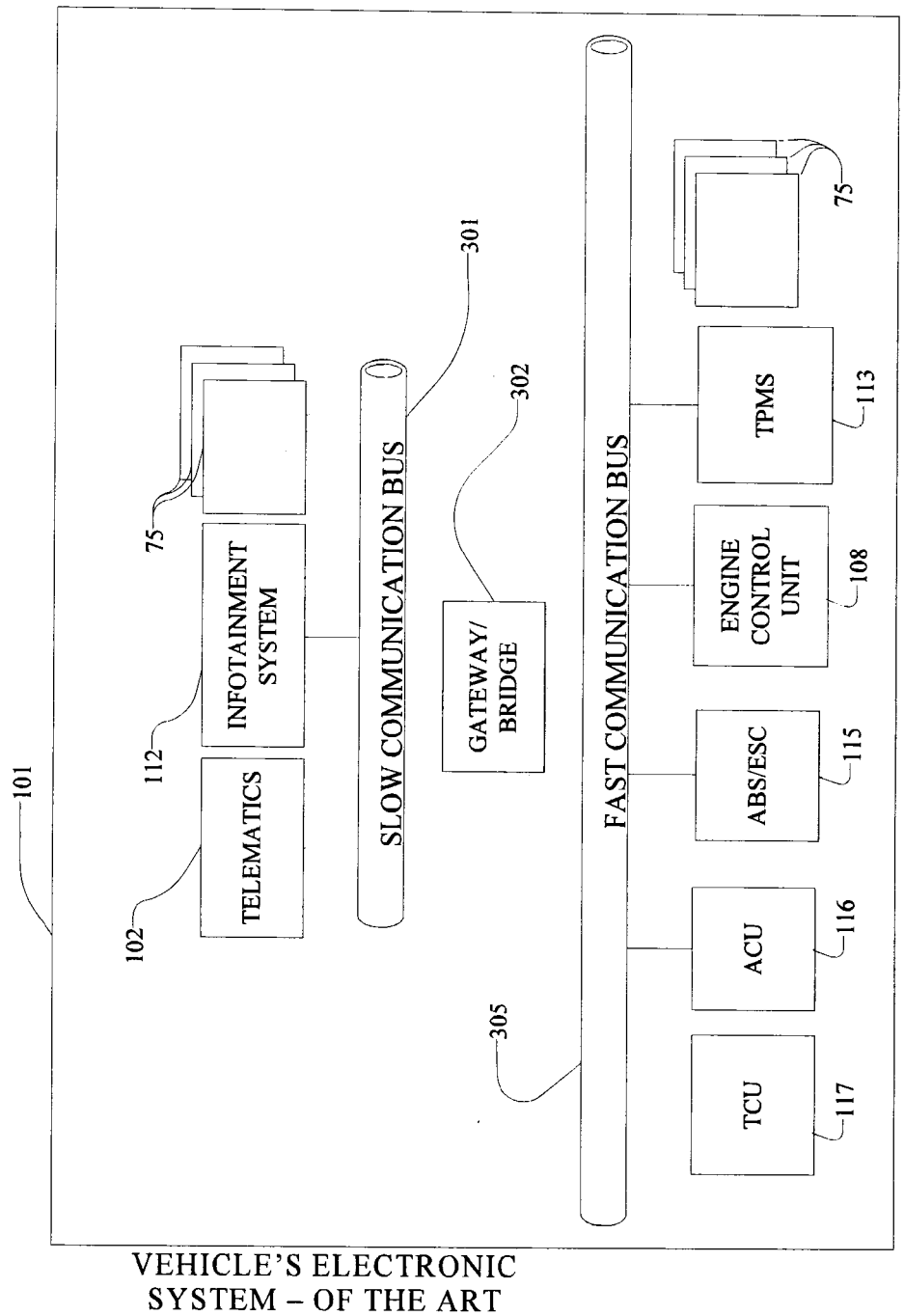
FIG. 3 illustrates an example of a vehicle's internal electronic system of the art, comprising of ECUs connected to two communication buses with different speeds, and a bridge or a gateway connecting the two buses.
Figure 4:
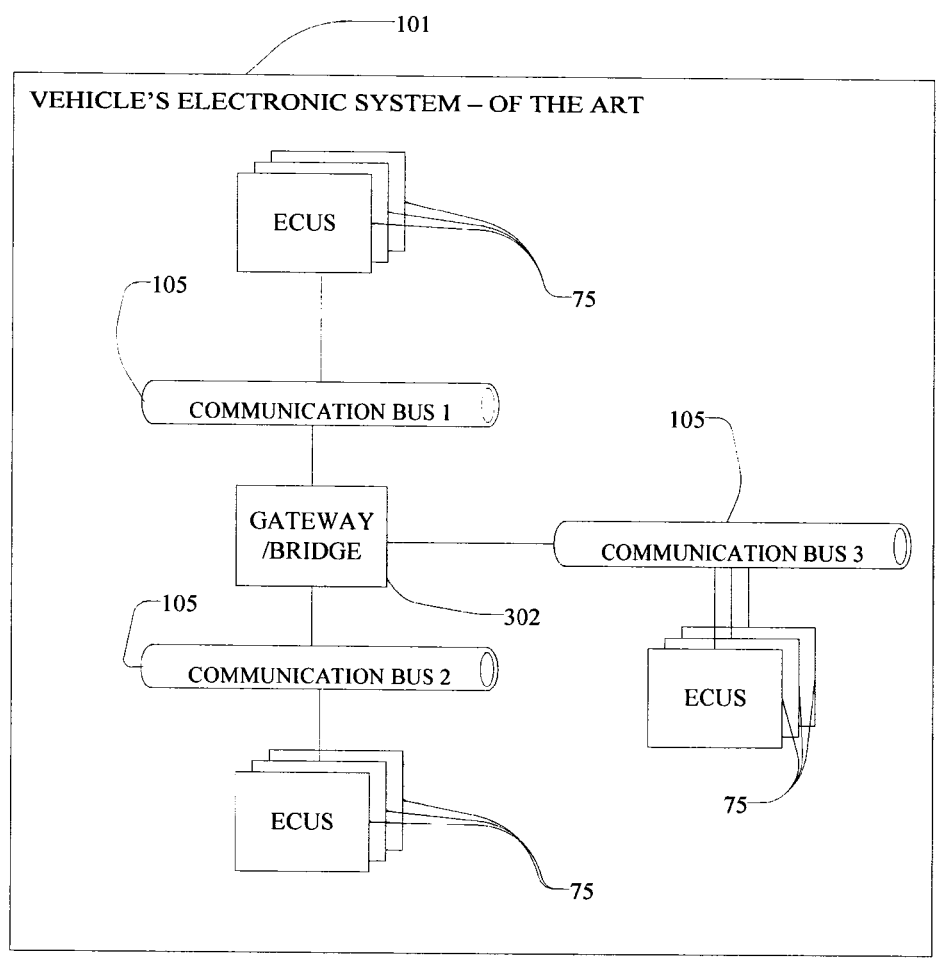
FIG. 4 is a more general example of the vehicle's internal electronic system of the art illustrated in FIG. 3 wherein a gateway or a bridge are connected to multiple communication buses.
Figure 5:
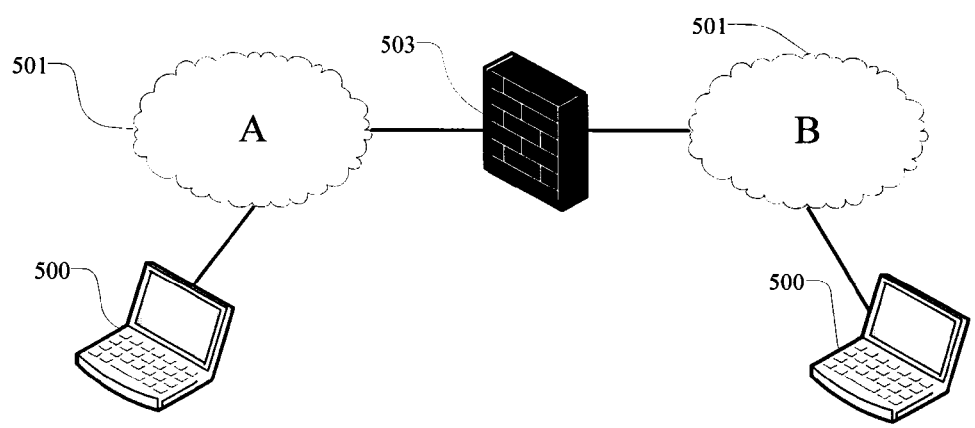
FIG. 5 illustrates two networks of the art separated by a firewall.
Figure 6:
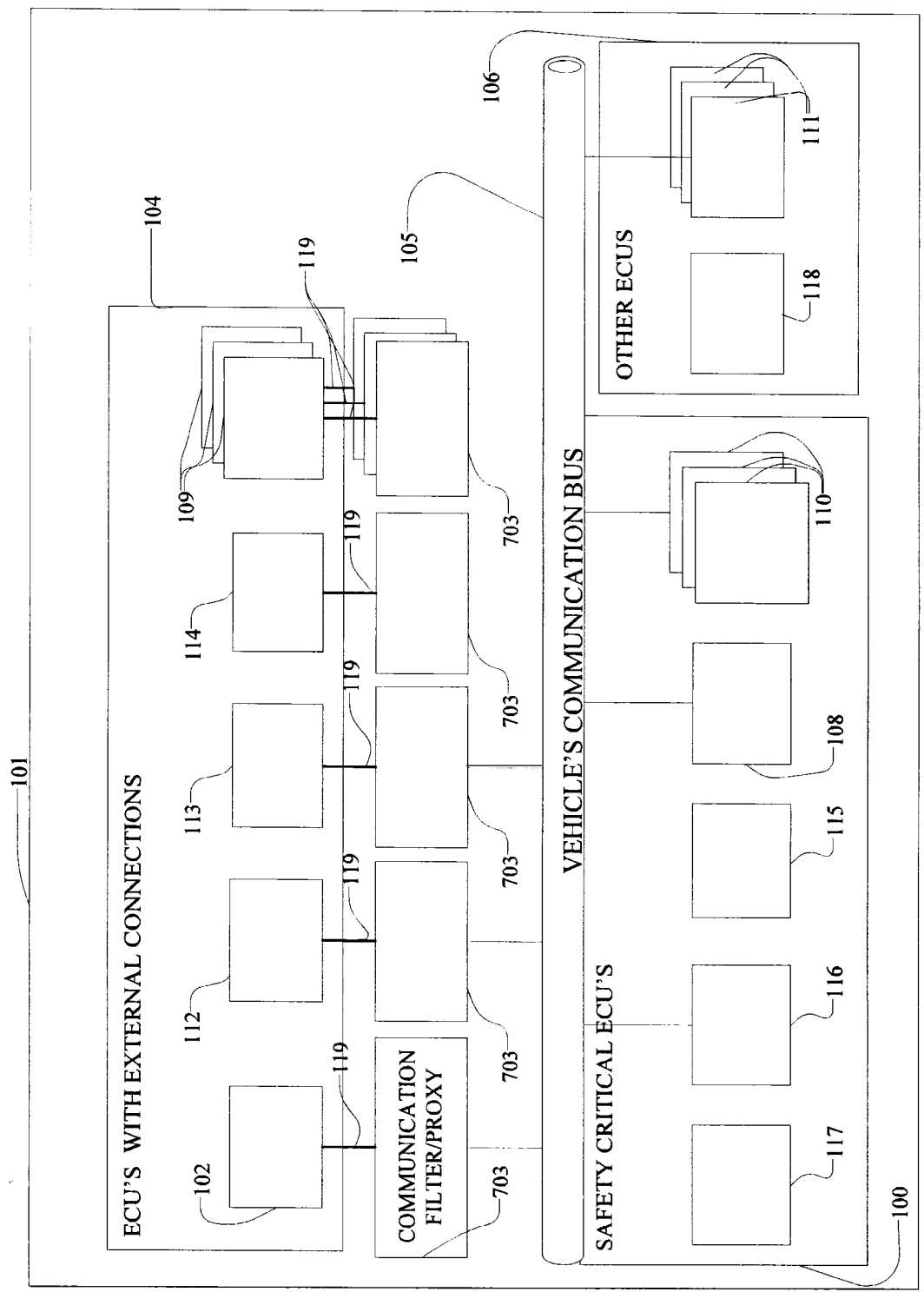
FIG. 6 is an illustration of the electronic system illustrated in FIG. 2 wherein all the ECU's with an external connection are protected by standalone security systems (communication filter/proxy), according to an embodiment of the invention.

FIG. 6 illustrates stand-alone security system integration, according to some embodiments. FIG. 6 is an illustration of the electronic system 101 illustrated in FIG. 2 protected by standalone security systems (referred to as communication filter/proxy devices) 703 of the invention. All ECUs with external communication interfaces 104 are protected by stand-alone communication filter/proxy protection devices 703. The ECUs 104 are connected to the security system 703 via an interface 119. The interface 119 can be any communication interface including a communication bus 105.

In some embodiments, the security system 703 is a stand-alone system or device. The security system 703 has at least two communication interfaces and may additionally have a configuration port.

In some embodiments, the security system 703 is placed between an ECU that has an external interface 109 (physical or wireless e.g. radio or telematics) and the communication bus 105. Each ECU which has an external connection 109 may be serially connected to the security system 703 in order to protect other ECUs 75 from the communication originating from it.

In some embodiments, the security system 703 is integrated with ECUs that don't have an external interface 106 in order to deal with threats such as vehicle theft, chip tuning, unauthorized ECU 75 replacement etc.

In some embodiments, the power supply to the security system 703 is either external or originates from the communication interfaces (a dedicated line or bootstrapped from the communication bus 105).

Optionally, the stand-alone security system 703 can electrically drive the communication bus 105 attached to it (e.g. provide negative voltage and termination on a CAN bus 105). This option may be configurable for each of the communication ports, depending on the implementation. This option emulates the physical properties of the bus 105 towards any segment it is connected to. In case of retrofitting; it saves the need to install an additional physical driver to the bus 105.

In some embodiments, this integration allows for the retrofitting of an automobile, without replacing existing ECUs 75.

In some embodiments, when each security system 703 generally handles only one ECU 75, its configuration and operation is rather simple, and it can be implemented with simple hardware architecture (compared to other alternatives).

Gateway Device

In some embodiments, the security system 703 is a stand-alone system or device. The security system 703 has at least two communication interfaces and may additionally have a configuration port.

Figure 7:
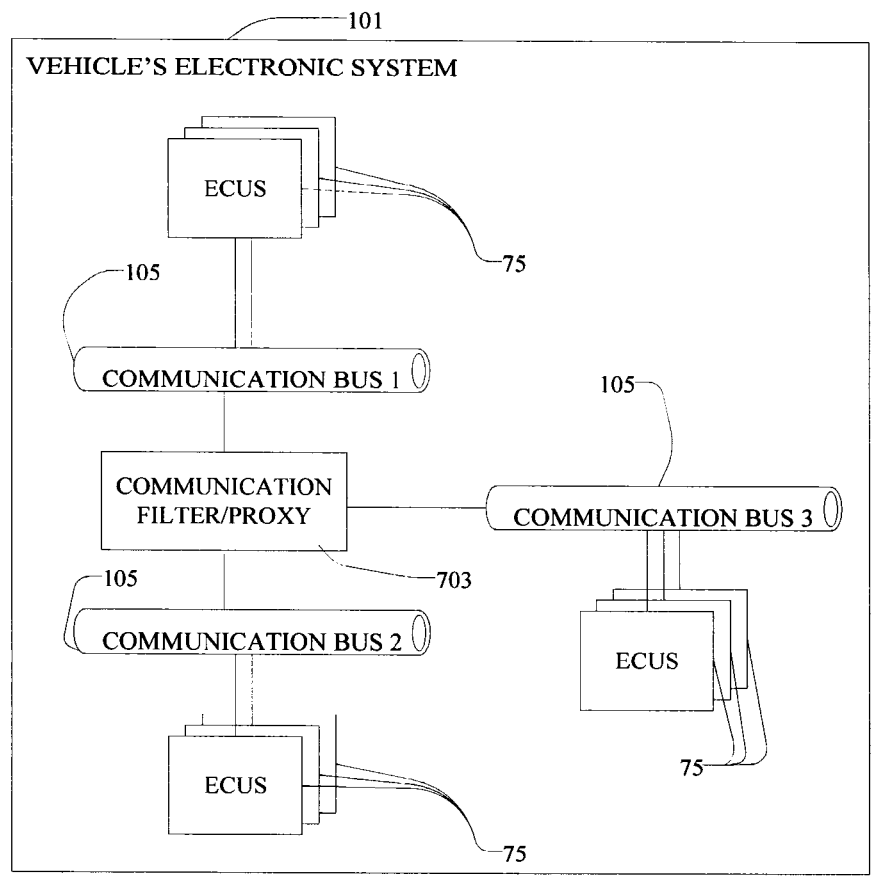
FIG. 7 exemplifies the integration of the security system (communication filter/proxy) as a gateway between three communication buses, according to an embodiment of the present invention.
Figure 8:
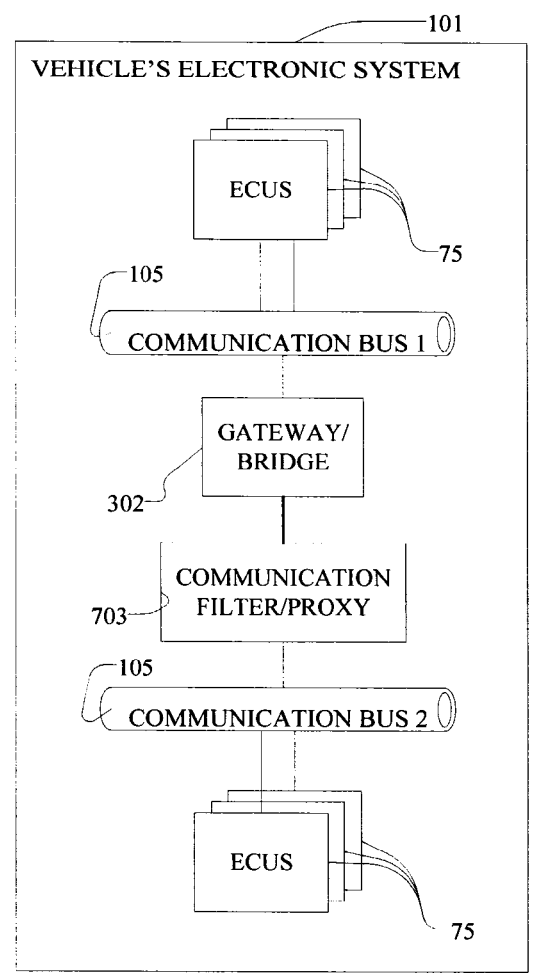
FIG. 8 illustrates the integration of the security system (communication filter/proxy) connected serially to an existing gateway, according to an embodiment of the present invention.

In some embodiments, the security system either replaces an existing gateway/bridge 302, as shown in FIG. 7, or is integrated between a gateway/bridge 302 and one of their connected communication buses 105 as shown in FIG. 8.

Optionally, the security system 703 can electrically drive the communication bus 105 similarly to the stand-alone security system or device 703 described above.

In some embodiments, if the security system 703 replaces an existing gateway/bridge 302, it will also function as one (e.g. converting protocols, connecting the buses 105).

In order for this type of integration to be effective, an appropriate architecture of the automobiles' communication buses 105 must be implemented. In some embodiments, the design may have to include a security system of the invention 703 in every path between a safety critical ECU 110 and an ECU with an external interface 109 (e.g. all the ECUs with an external connection 104 are connected to a single segment 105, separated from the other ECUs 75 by a security system 703).

In some embodiments, such integration allows for the retrofitting of an automobile without replacing existing ECUs 75.

In some embodiments, each security system 703 has to handle the communication of several ECUs 75 connected to the bus. Therefore, the configuration and implementation is potentially more complex, and more complicated hardware is required. Such design may require an integration of a single security system 703. On one hand, such a security system 703 may be more complex and expensive. On the other hand, it substitutes multiple simpler security systems 703; therefore it may be financially worthwhile. Additionally, the design requires a single point of configuration which may become more convenient for design and maintenance.

Integrated Security System

Figure 9:
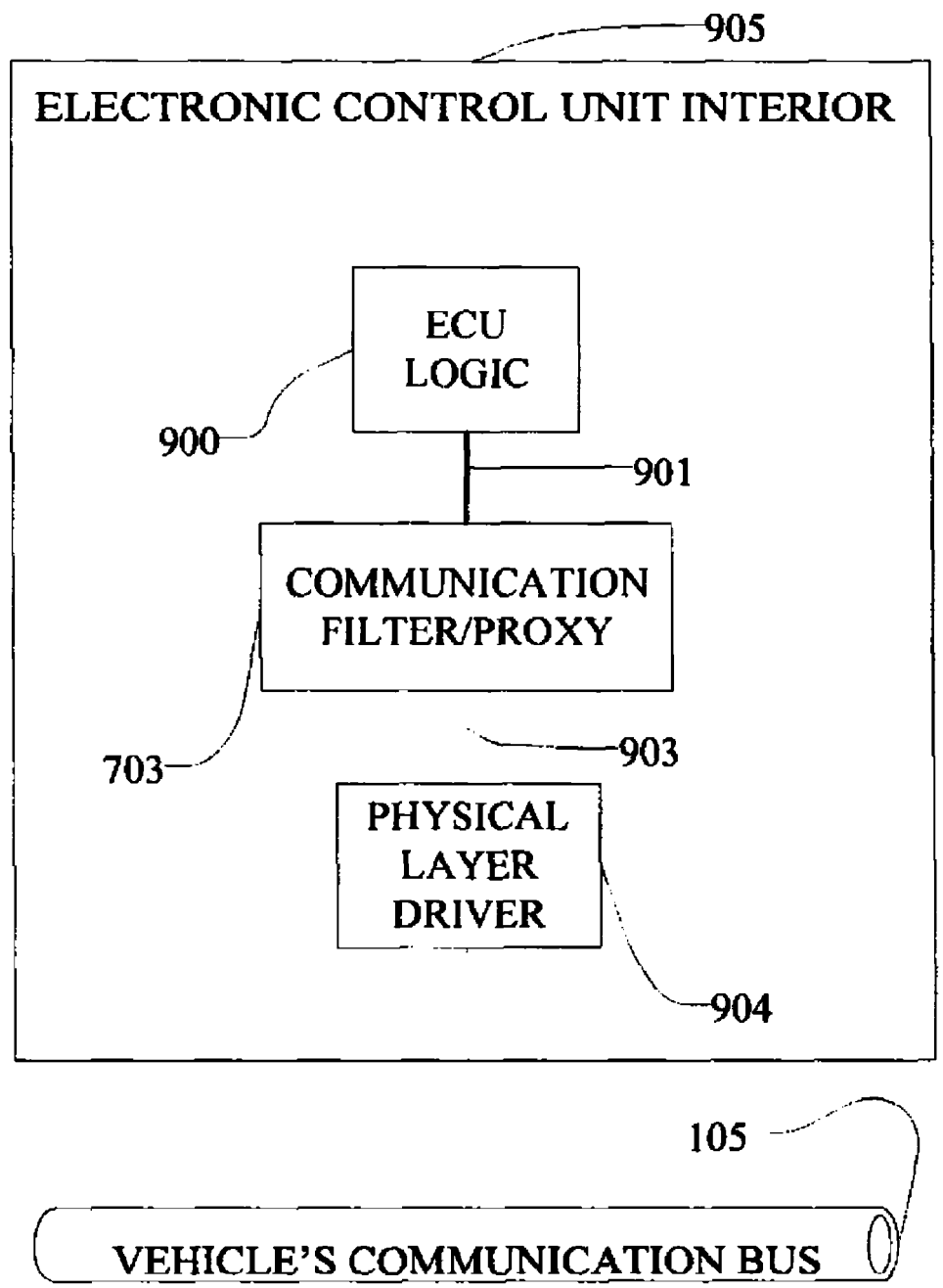
FIG. 9 illustrates the integration of the security system (communication filter/proxy) as an integrated security system inside an ECU, according to an embodiment of the present invention.

In some embodiments, the security system 703 is integrated inside an ECU 905 as depicted in FIG. 9. The security system 703 has at least two communication ports 901 and 903, one 903 connected to the physical layer driver 904 and the other 901 connected to the rest of the ECU's logic 900 (e.g. ECU's controller) using its native physical layer (e.g. Complementary Metal Oxide (CMOS) or Transistor Transistor Logic (TTL)). The physical layer driver 904 is connected to the communication bus 105.

In some embodiments, the integration of the security system 703 inside an existing ECU 905 will save many components (e.g. power supply, mechanical casing, physical drivers etc.) thus making the design cheaper and more robust.

In some embodiments, the security system 703 will be integrated in the same ECUs 905 (those with external interfaces 104) and with the same configurations as in the case of a stand-alone security system 703.

In some embodiments, integration will enable a supplier of ECUs 75 to integrate a security solution 703 done by a trusted 3rd party, thus providing a complete and secure ECU 905.

In some embodiments, this solution will not allow for retrofitting into existing ECUs 75. However, it will be viable for new designs. This solution embodies all of the advantages of the stand-alone security system 703.

When referring to an ECU 75 coupled with a security system it may also refer to an ECU with an integrated security system as in the case of 905.

Internal Design

For clarity reasons, the security system's 703 core which is responsible for the security aspects of the security system 703 (e.g. filtering or serving as a proxy) is referred to in some embodiments described herein as "filter element" or "proxy element". However, it is possible that an element designated as "filter element" may also provide proxy functionality, and/or an element designated as "proxy element" may also provide filter functionality. All these variations and combinations are encompassed by the present invention.

Additionally, for simplicity's sake the message flow is depicted in some embodiments herein as if a simple rule based filter is used, although a more complex rule based filter can be applied and is encompassed by the present invention. For example, multiple rules can be applied to the same message.

Top View

Figure 10:
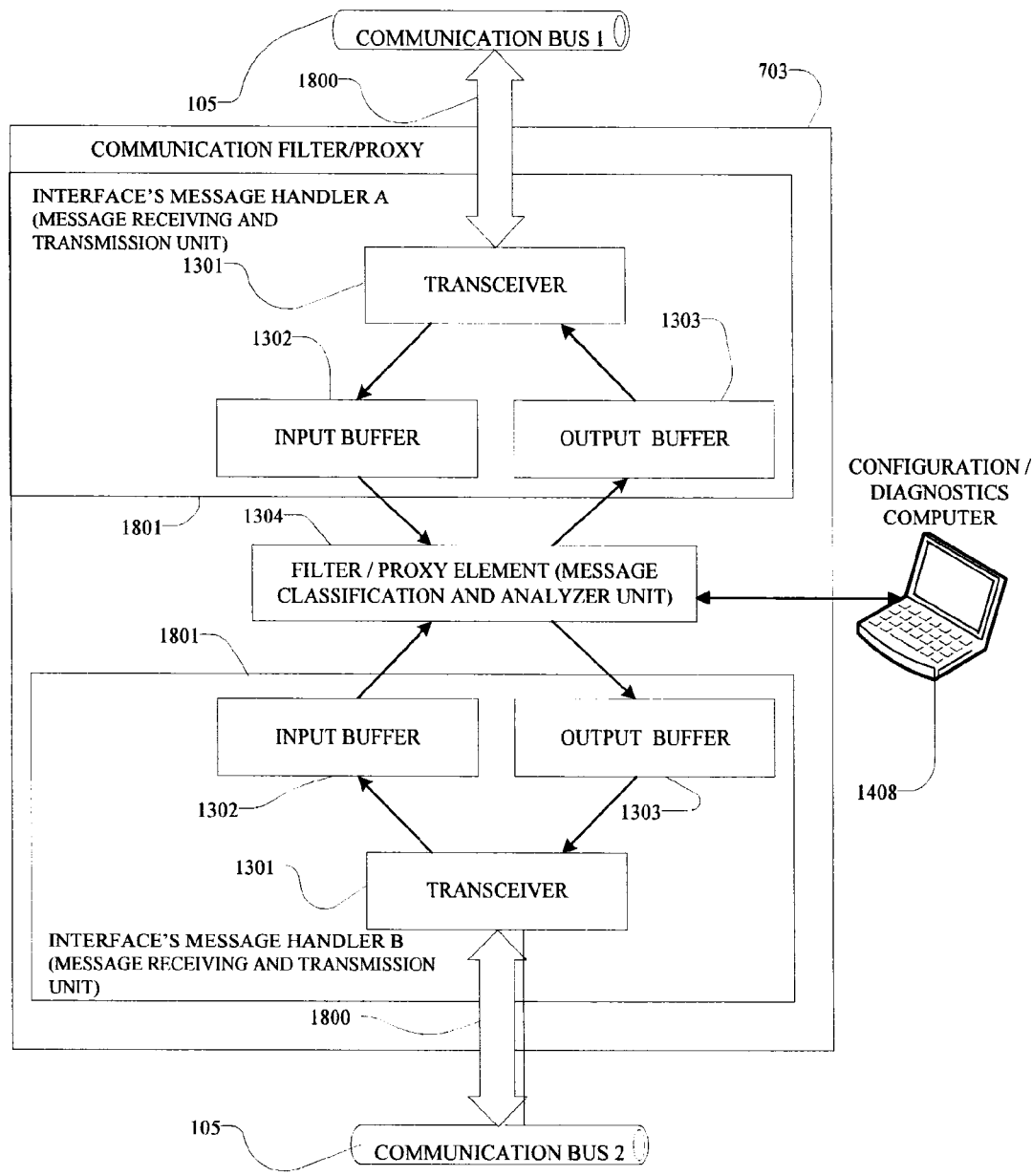
FIG. 10 illustrates a general message flow between two communication buses connected to a security system (communication filter/proxy), and a connection to a configuration and diagnostics computer, according to an embodiment of the present invention.

FIG. 10 illustrates the security system's 703 general overview, in which the filter/proxy element 1304 (which functions as the message classification unit and the message analyzer unit) connects to two communication buses 105 using two message handlers 1801, according to some embodiments of the present invention. In some embodiments, the filter/proxy element 1304 receives messages from one of these buses 105 through an input buffer 1302 (of the message handler 1801), filters these messages, and sends the filtered messages through the appropriate output buffer 1303 (of the message handler 1801), to the other communication bus 105. The security system 703 can also serve as a filtering gateway between two different buses 105 and do any necessary conversions (such as protocol conversions) between the buses 105, as seen in FIG. 7.

In some embodiments, as seen in FIG. 10 the security system 703 can be configured by an external device (e.g. configuration/diagnostics computer) 1408, through an out of band (OOB) interface such as a serial connection (e.g. RS-232). The configuration affects the security system's 703 behavior, the messages it lets through, changes or blocks, and any other of its configurable properties. The new configuration can be saved so next time the security system 703 resets, the new configuration will run at startup.

The message handler 1801 includes (1) a message receiving unit for receiving a message to its input buffer 1302 from the communication bus 105; and (2) a message transmission unit for transmitting a message from its output buffer 1303 to the communication bus 105.

Figure 11:
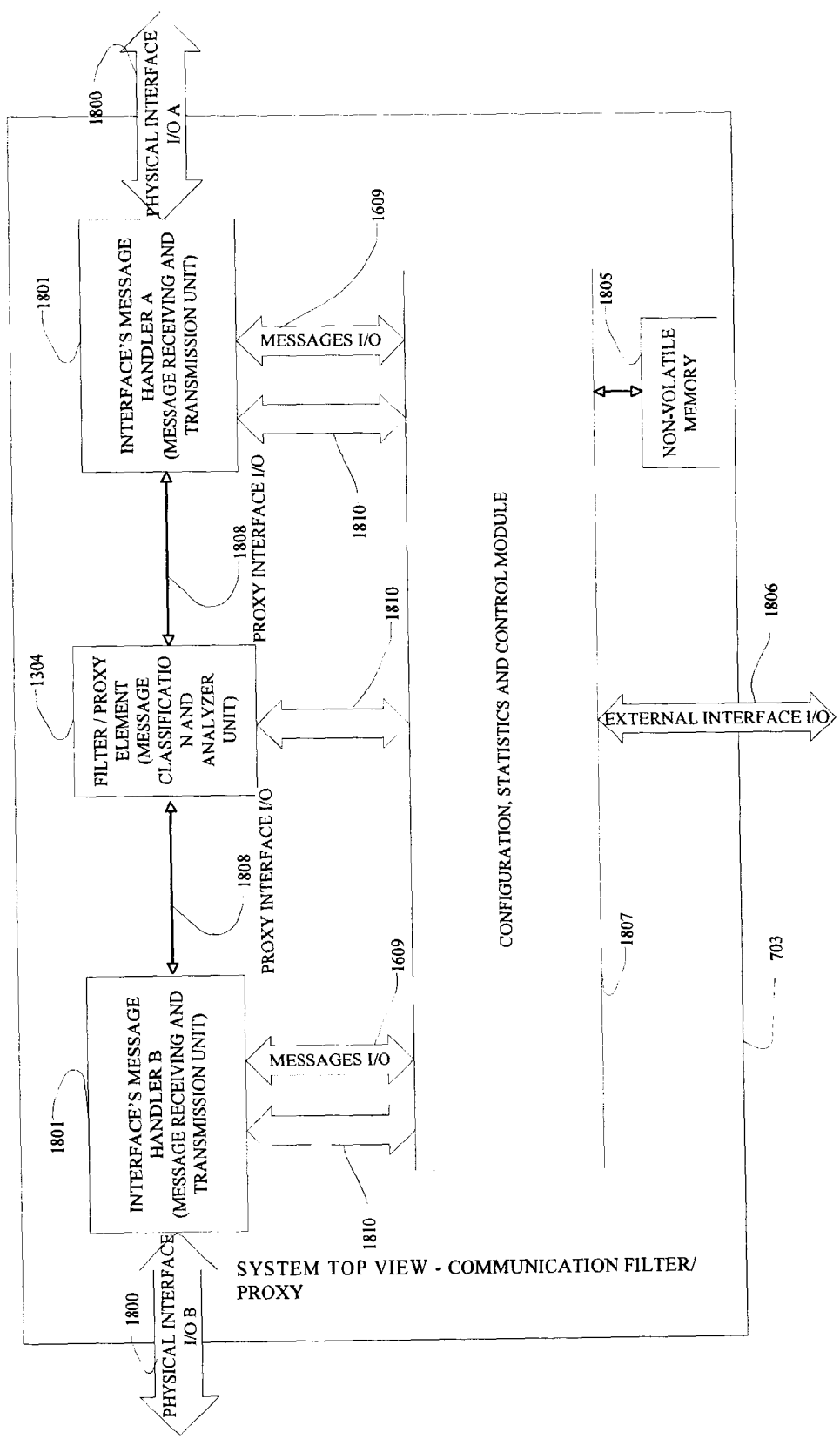
FIG. 11 is a top view illustration of the various modules of one embodiment of the security system (communication filter/proxy), according to an embodiment of the present invention.
Figure 14:
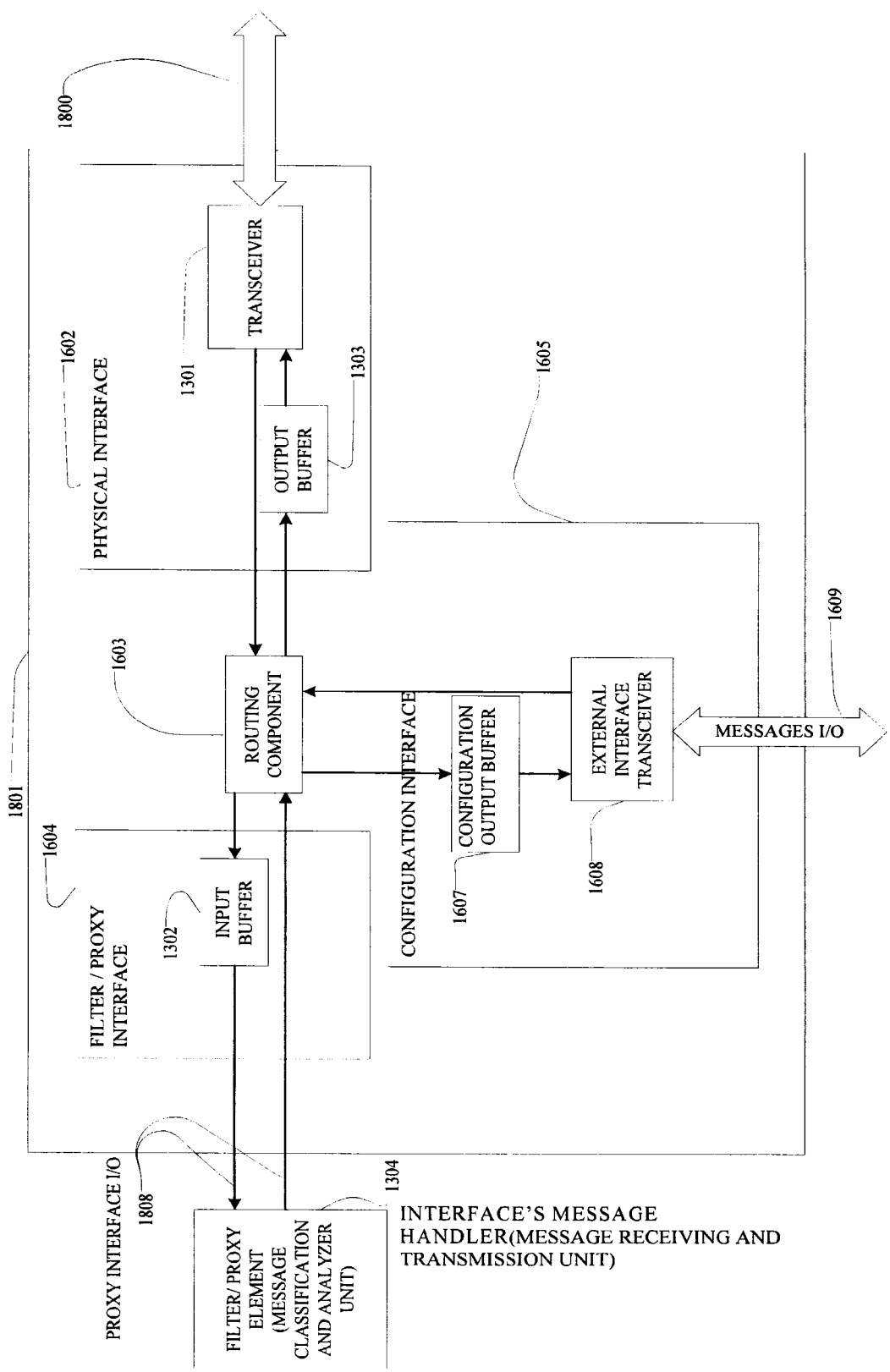
FIG. 14 illustrates an interface's message handler, which also functions as the message receiving and transmission units. It is an example of an integrated message receiving & transmission unit, according to an embodiment of the present invention.
Figure 15:
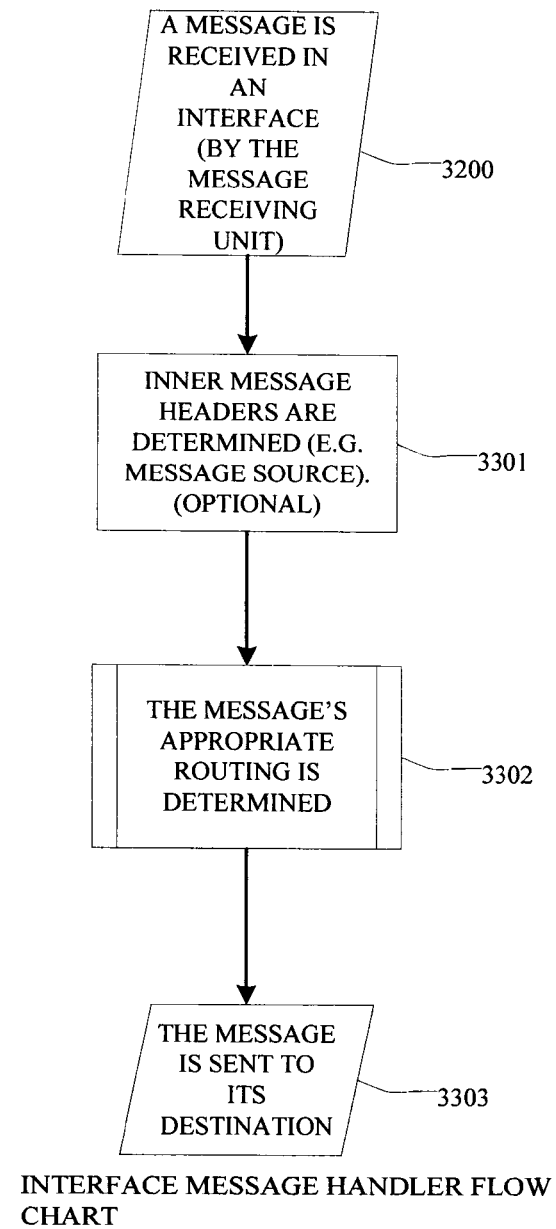
FIG. 15 is a flowchart illustrating an example of the message handling in a message handler such as illustrated in FIG. 14, according to an embodiment of the present invention.

FIG. 11 illustrates the security system's 703 top view in more detail than illustrated in FIG. 10, according to some embodiments of the present invention. Messages arriving into message handler 1801 (described in more detail in FIG. 14, and also functions as the message receiving unit and the message transmission unit) through the physical interface I/O 1800, or any other interface of it, are sent to the proper interface. If sent to the configuration interface, it will be handled by the configuration, statistics and control module 1807 which can handle it in any configured way (e.g. send it through the OOB interface I/O 1806 out of the system for logging, inspection, or any other purpose). If the message is sent to the filter/proxy element 1304, it inspects it and decides whether to send it to the destination interface or not. If the message is to be sent to the destination interface by the filter/proxy element 1304 (combined message classification unit and message analyzer unit), it is sent to the appropriate message handler 1801. The message handler 1801, handles the message in some embodiments as depicted in FIG. 14 and FIG. 15, and sends it to the proper destination interface (e.g. physical interface I/O B 1800). The interfaces 1808 between the message handlers 1801 and the filter/proxy element 1304 are named "proxy interface" and they fit both filters and/or proxies (they can also be referred to as "filter interface" or "filter and/or proxy interface").

Figure 12:
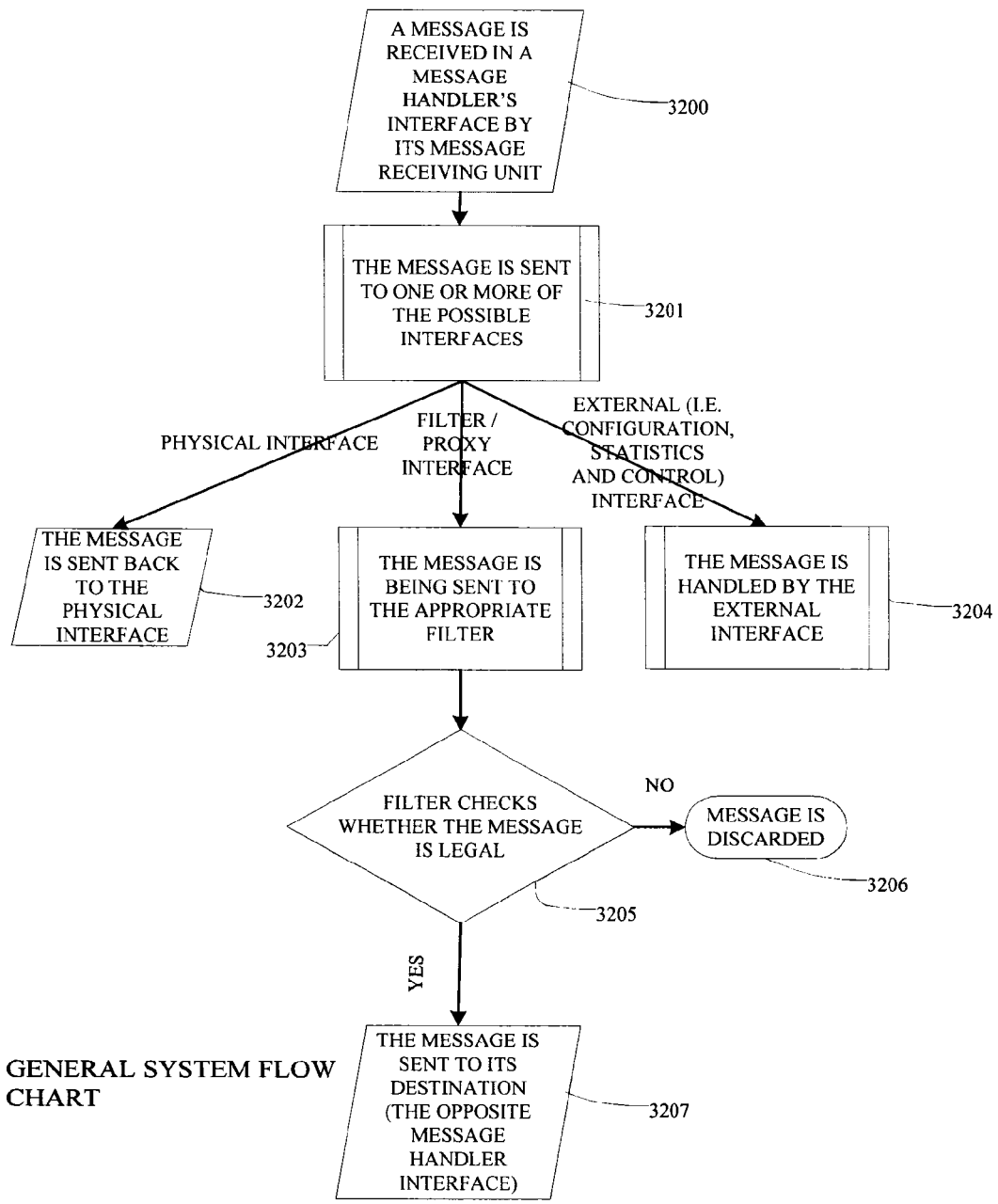
FIG. 12 is flowchart illustration of one example of message handling done by the embodiment illustrated in FIG. 11, according to an embodiment of the present invention.

Some embodiments of the described process are illustrated in FIG. 12. In step 3200, a message is received in the message receiving unit of the message handler's 1801 interface, e.g by its physical interface, and is sent to one or more of its interfaces in step 3201. If the message is to be sent to the physical interface, it's sent to its physical interface in step 3202. If the message is to be sent to the configuration interface 1602, it is handled by the configuration interface 1605 according to its functionality, e.g. printed on the screen of the operator, written to a log, etc. in step 3204. If the message is to be sent to the filter/proxy interface 1604, it is sent to the appropriate filter element 1304, and is classified by its message classification unit in step 3203, which sends it to the filter element's message analyzer unit. The filter element 1304 then checks the legality of the message (by the message analyzer) in step 3205. If the message is illegal, it will be discarded in step 3206. If the message is legal, it is sent to its destination (which can be the opposite message handler 1801) in step 3207.

Message Handler

Figure 13:
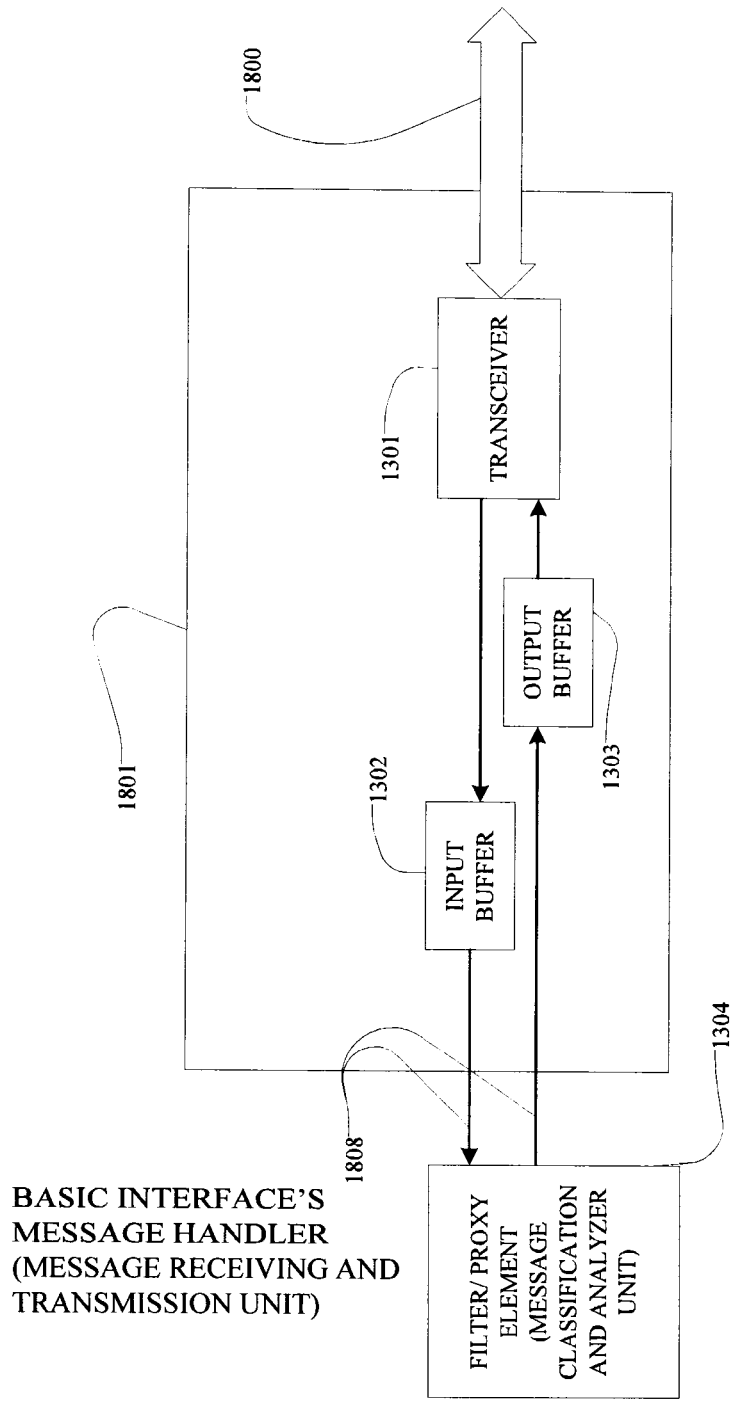
FIG. 13 illustrates a basic interface's message handler without a configuration interface. This is an example of an integrated message receiving & transmission unit, without the configuration interface, according to an embodiment of the present invention.

FIG. 13 depicts the simple form of the message handler mechanism 1801 each (filter/proxy element 1304) interface has, according to some embodiments of the present invention. In some embodiments, each message arriving from a physical interface 1800 is processed by a message receiving unit of a message handler 1801 and sent to the input buffer 1302 of the filter/proxy element 1304. Each message which originates from another interface's message handler and is destined to interface 1800 and allowed by the filter/proxy element 1304 is sent to the appropriate output buffer 1303. From the output buffer 1303 it is sent to the message transmission unit of the message handler 1801 and sent out to the physical interface 1800. The message receiving unit and the message transmission unit can be either separate units, or integrated together into a message handler 1801 for more efficient two-way communications with a communication bus 105.

FIG. 14 describes a more complex form of the interface's message handler 1801 than described in FIG. 13, according to some embodiments of the present invention. Each message arriving from a physical interface I/O 1800 to the physical interface 1602 through the transceiver 1301 goes into the routing component 1603. The routing component can determine the message's inner headers (such as message source or any other information about the message) and then decides towards which destination to send the message, according to its routing algorithm. The possible destinations include, but are not limited to, zero or more of the interfaces illustrated in the figure through their respective input buffers, such as: the physical interface 1602, the filter/proxy interface 1604 or the configuration module interface 1605. There can be any number of other such interfaces as well. The message is sent to the proper interface which handles it. The routing component 1603 can be configured through the configuration module 1807 (the configuration dataflow is not explicitly drawn), to change its behavior, such as changing its routing tables or routing algorithm. Messages arriving from the filter/proxy element 1304 through its I/O interface 1808 are sent to the routing component which sends them to the proper interface as described above. Messages arriving at the configuration module interface 1605 from the routing component are sent to the configuration module 1807 through the configuration output buffer 1607 and the external interface transceiver 1608. The external interface transceiver 1608 can be implemented as a software and/or hardware module. In some embodiments, the external interface transceiver 1608 is optional and can be omitted. The configuration module 1807 handles messages in various ways, e.g. print on the operator screen (if such thing exists), and can be used for any purpose, e.g. inspection, sending messages, controlling or debugging the system. FIG. 15 describes the message flow in the interface's message handler 1801, according to some embodiments. A message is received by the message receiving unit in one of the message handler's interfaces in step 3200. The message headers of the message can then be determined in step 3301, and the message's appropriate routing is decided in step 3302. The message is then sent to its destination interface in step 3303. The classifier and analyzer are part of the filter/proxy element 1304, so only if the message is directed to the filter/proxy element 1304 they will handle it. The other options routing a message are to the physical interface 1602 or the configuration interface 1605. Since the classifier and analyzer are not part of the message handler, 1801 they are not described here. The interface's message handler 1801 may collect and save any statistics information about the system and the messages being sent to it or from it (e.g. the number of messages that were received from or sent to each interface).

In some embodiments, each filter element 1304 is coupled with at least 2 such message handlers 1801 and each proxy element 1304 is coupled with at least one such message handler 1801, one for each interface that they are connected to.

Configuration Module

The "configuration module" 1807 denotes the "configuration, statistics and control module" 1807 (some embodiments being illustrated in FIG. 11).

In some embodiments, the configuration module 1807 is connected to the Interface's messages handler 1801 using two types of connections: a messages connection 1609 and a configuration connection 1810. The configuration module 1807 can send or receive messages to/from the interface's message handler 1801 through the messages connection 1609. The configuration module 1807 is connected to the filter/proxy element 1304 using a configuration connection 1810. The configuration module 1807 controls the configuration of the filter/proxy element 1304 and the message handlers 1801 through the configuration connection 1810, changing their behavior, logging their activities, and/or any other configurable change they support. This module 1807 is controlled externally using an OOB interface (external interface I/O) 1806, which can be any data interface (e.g. Universal Asynchronous Receiver Transmitter (UART) interface). The configuration module 1807 can also have a non-volatile memory 1805 connected to it (e.g. flash memory). This memory 1805 stores data which is used by the configuration module 1807. Such data can include, but is not limited to, different system configurations to be loaded into the system components (e.g. the filter elements 1304 and the interfaces' message handlers 1801), and statistical information. It might also, but not necessarily, be possible to manipulate this memory 1805, through the OOB interface 1806 or directly. Such manipulation may include, but is not limited to, deleting the memory, copying it, dumping it, copying new information into it, etc.

In some embodiments, the configuration module 1807 can be connected in-band, i.e. to one or more of the communication buses 105, given it is protected in some manner. In some embodiments, this in-band configuration is optional and can be disabled after the initial configuration stage (e.g. during vehicle manufacturing or assembly) is completed.

Filter/Proxy Element

Figure 16:
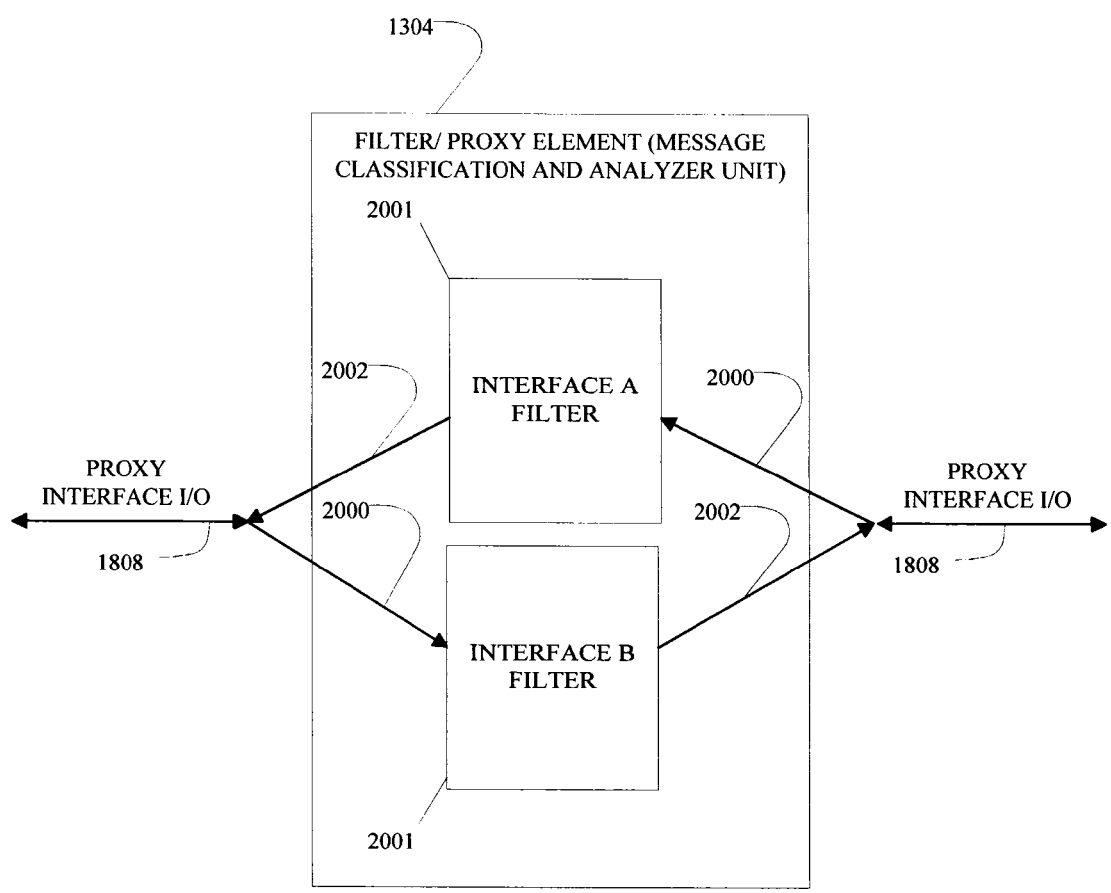
FIG. 16 is a block diagram illustrating one example of a filter/proxy element (combined message classification/message analyzer unit), according to an embodiment of the present invention.
Figure 17:
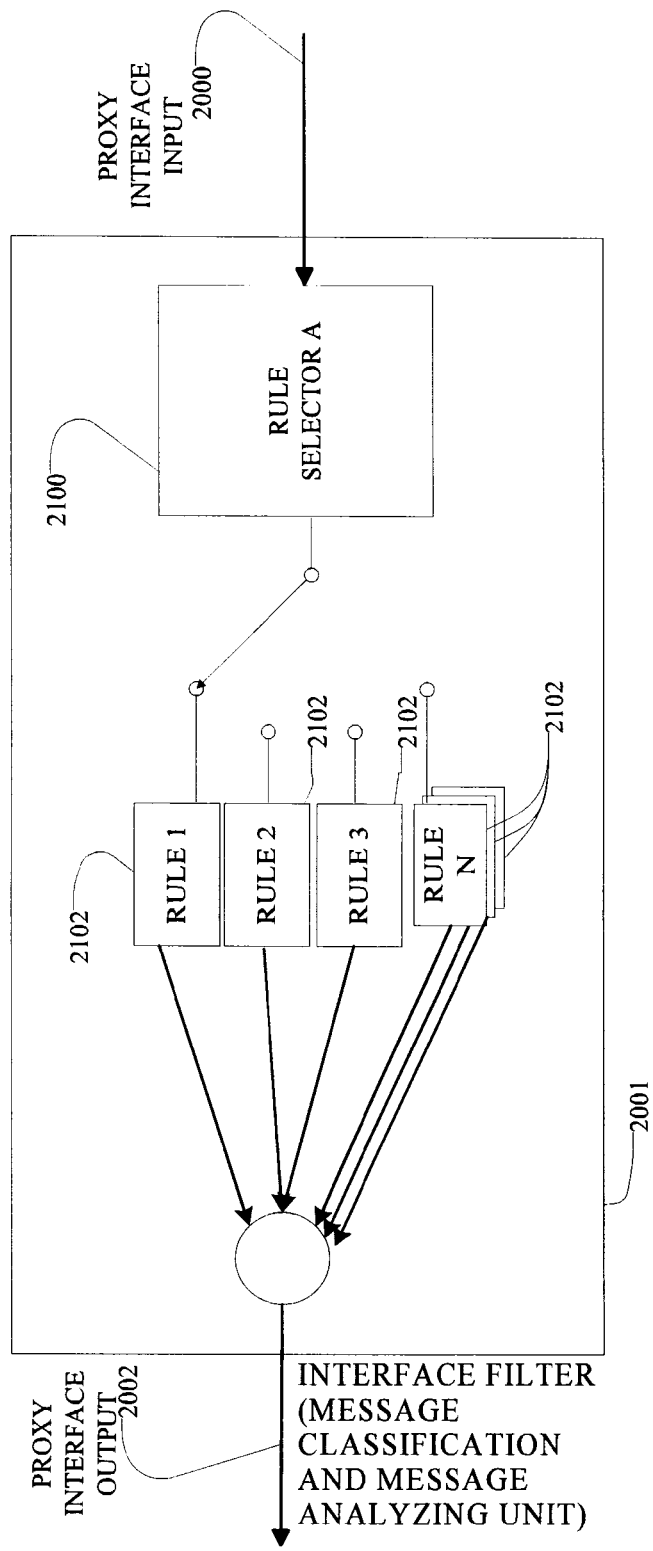
FIG. 17 is a block diagram illustrating one example of the filter/proxy element (combined message classification/message analyzer unit) illustrated in FIG. 16, according to an embodiment of the present invention.

FIG. 16 illustrates a simple example of a filter/proxy element (combined message classification and message analyzer units) 1304, built from two interface filtering components 2001, according to some embodiments of the present invention. Each interface filter component 2001 filters messages arriving from its input interface (message receiving unit) and sends them after filtering to its output interface (message transmission unit). A more detailed example of 2001 is illustrated in FIG. 17, according to some embodiments. A message arrives from the proxy interface input 2000 of the message handler 1801, and goes into the rule selector 2100 of the message classification unit (also referred to as classifier), which according to the message properties (such as headers, source, destination, data, or any other properties) sends it to the proper rule 2102 in the message analyzer unit. If no proper rule is found, the rule selector rejects the message according to its policy (possible policies are described below). The appropriate rule 2102 (of the plurality of rules 2102) which receives the message checks it more thoroughly and decides whether the message should be allowed or not, or should be modified. The action upon the result of a rule 2102 is part of the message analyzer's unit. If the message should be allowed, the rule 2102 passes the message to the proxy interface output 2002 connected to the message transmission unit of the message handler 1801. If the message should be changed, the rule 2102 (of the analyzer) can make the necessary changes and pass the message to the proxy interface output 2002 connected to the message transmission unit. In some embodiments, if the message should not be allowed, the rule selector 2100 is notified and it chooses the next proper rule 2102 for the message or rejects the message according to its policy. If no more proper rules 2102 are found, the rule selector 2100 acts according to its policy in such case. The rule selector 2100 policy may include, but is not limited to, discarding the message, notifying the sender, or performing any preconfigured action. A rule 2102 can be of any type and can also be timing rule as will be described below. A rule 2102 may require that a message is signed, that a message signature is verified, or conditional transmission of a message as described in the authentication module section below. It should be clear that the term rule 2102 encompasses any combination of a plurality of rules 2102, thus more than a single rule 2102 can apply to any one message. The number of rules 2102 is not limited and can vary. In some embodiments, the configuration module 1807 may also control the adding or removing of rules 2102 dynamically. A rule 2102 can contain any filtering logic to decide whether a message is legal or not. Such logic may include but is not limited to, properties of the message, message's headers, message's content, message length, the filter state, timings of the message or any other parameters or properties or any combination of these properties, in a whitelist or blacklist manner. An example of a filtering logic can be checking that the message destination is 'y', the ID of the message is between 'xx' to 'zz', the message data length is 3 and the first two bytes of the message are 'aa' and 'bb'.

Figure 18:
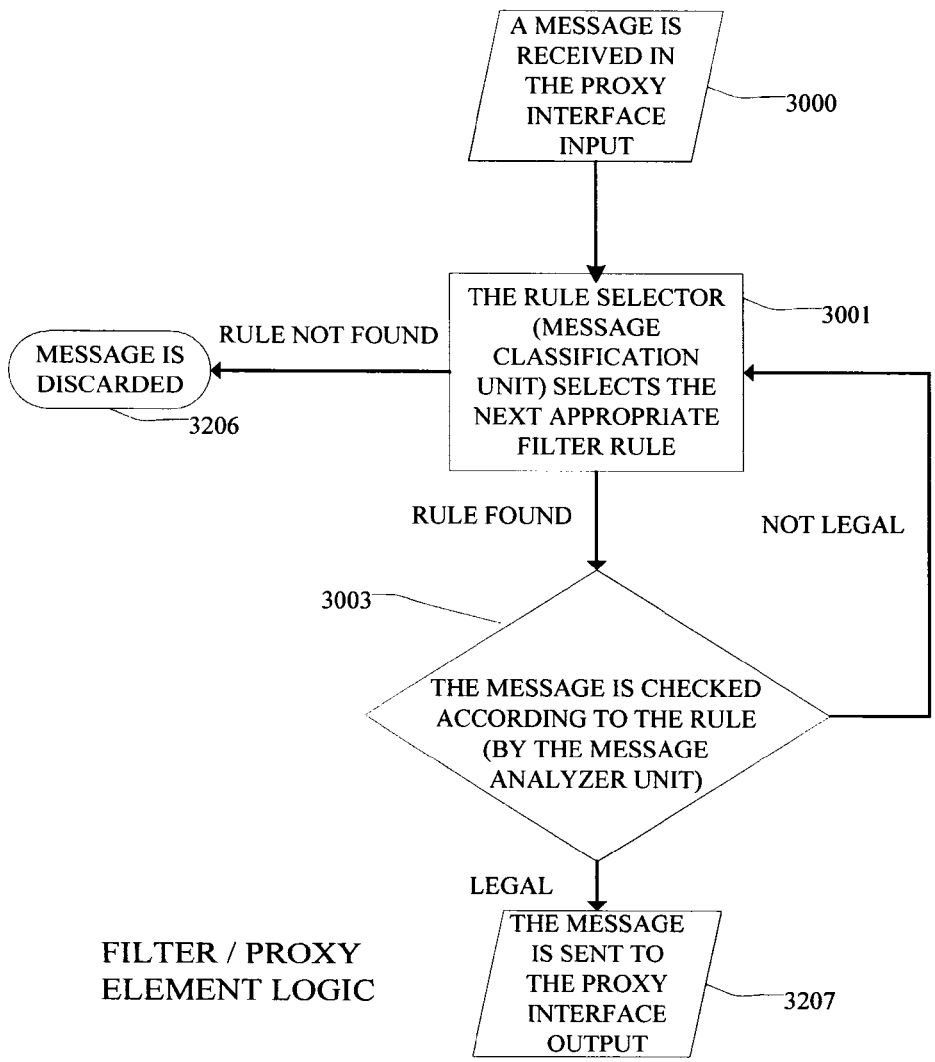
FIG. 18 is a flowchart illustration of one example of a message handling logic implemented by a filter/proxy element (combined message classification/message analyzer unit) illustrated in FIG. 17, according to an embodiment of the present invention.

FIG. 18 illustrates an example of the filter logic and the message flow described, according to some embodiments. The message is received in the proxy interface input in step 3000 and is delivered to the message classification's unit rule selector 2100, which selects the next appropriate filter rule 2102 to filter the message with in step 3001. If no appropriate rule 2102 was found, the message can be discarded in step 3206. If a rule 2102 was found, the message is checked by the rule 2102 (by the message analyzer unit) for its legality according the rule 2102 in step 3003. If the message is not legal according to the rule 2102, it returns to the rule selector 2100 to select the next appropriate rule 2102 in step 3001. In some embodiments, if the message is legal according to the rule 2102, it is sent to the proxy interface output 2002 in step 3207.

Timing Rules

Figure 19:
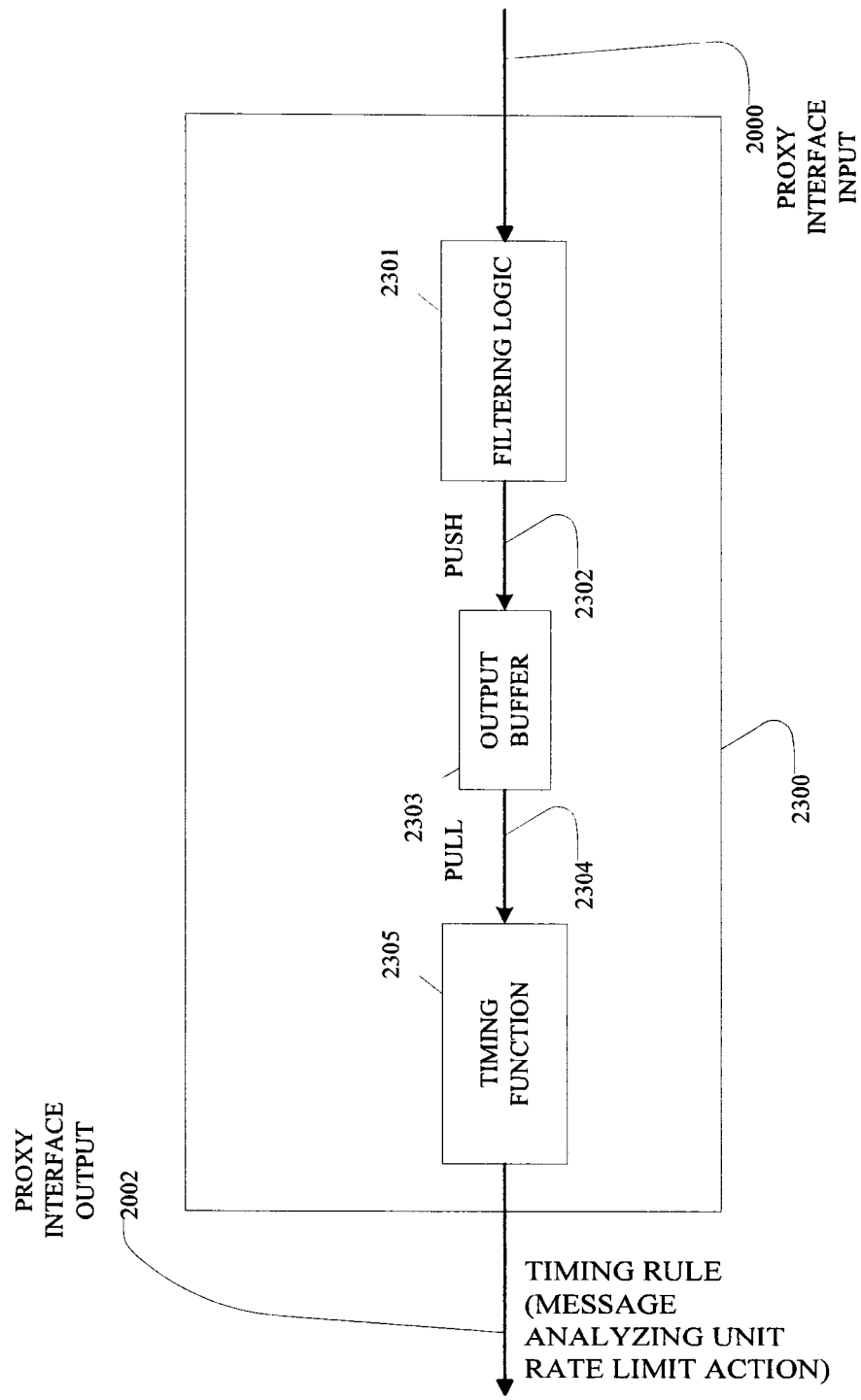
FIG. 19 is a block diagram illustration of one example of a timing rule. A timing rule is a rule that can be integrated in a filter/proxy element (in the message analyzer unit) as one of the rules used, according to an embodiment of the present invention.

FIG. 19 describes a timing rule 2300, which is a type of rule 2102 that can be added to the rules 2102 list (e.g. as rule 2102) in the filter element 1304 described above, according to some embodiments of the present invention. The difference between a timing rule 2300 and a regular rule 2102 is that the timing rule 2300 does not only filter the incoming messages, but it also applies rate limit according to a policy which can also include traffic shaping of the communication, for example, sending messages to the proxy interface 1808 in predefined timings (leaky bucket), thus preventing denial of service (DOS) attacks. When the rule selector 2100 sends the received message to a timing rule 2300, the filtering logic 2301 works as in a regular rule 2102. In case the message is allowed, it is sent through interface 2302 to the rule output buffer 2303, in which it is buffered and waiting to be sent to the proxy interface output 2002. When the right timing arrives, the timing function 2305 checks whether there are messages waiting in the output buffer 2303, and if so, pulls a message out through interface 2304 and sends it to the proxy interface output 2002. In case the message is illegal, the filtering logic 2301 will reject the message. In any case, be it a legal or illegal message, the rule selector 2100 can be notified of the operation's result.

Figure 20:
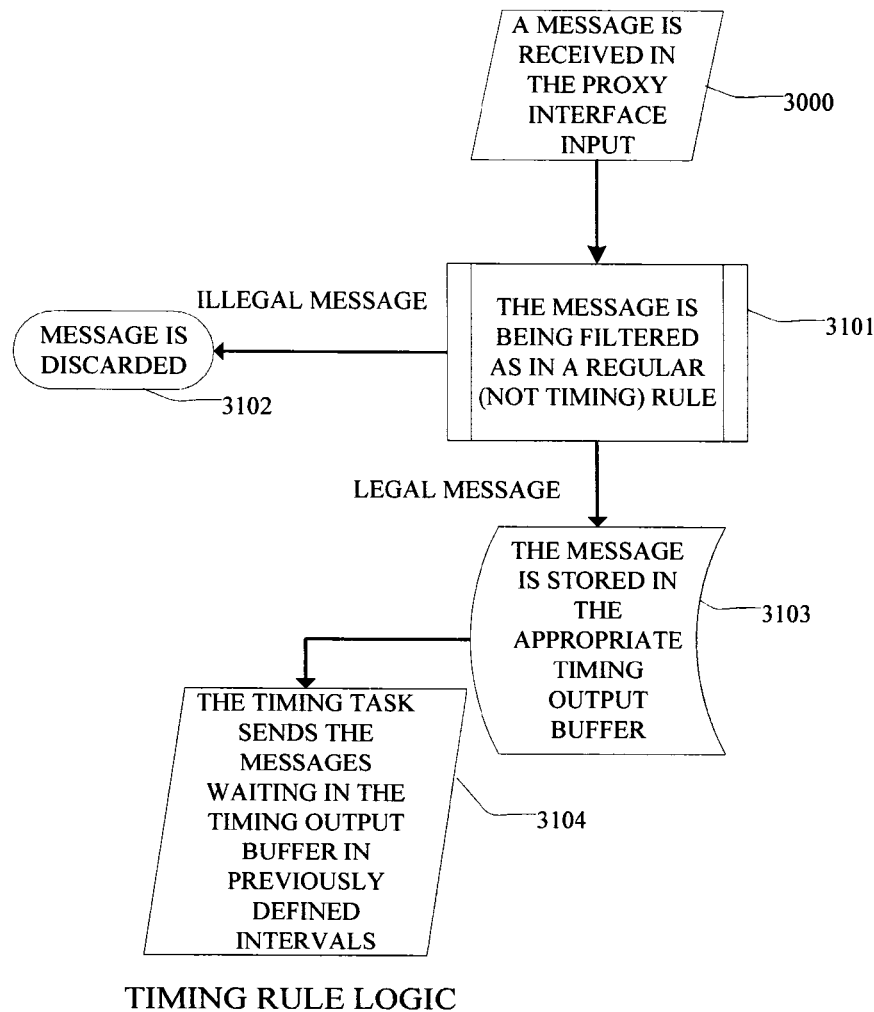
FIG. 20 is a flowchart illustration of one example of message handled by a timing rule illustrated in FIG. 19, according to an embodiment of the present invention.

FIG. 20 illustrates an example of the timing rule 2300 logic and the message flow described, according to some embodiments. The message is received in the proxy interface input 2002 in step 3000 and is being filtered as in a regular (not timing) rule 2102 in step 3101) If the message is illegal, it is discarded in step 3102. In case the message is legal it is stored in the output buffer of the timing rule 2300 and waiting to be sent in step 3103. When the time arrives, the timing task of the rule 2300 transfers the message waiting in the output buffer to the transmission unit to be sent to its destination in step 3104. The advantage of using a timing rule 2300 is preventing DOS attacks. Examples of such DOS attacks include, but are not limited to, rapid message sending and planed timing of message sending. Additionally this type of rule can help deal with malfunctions sending many messages over the communication bus 105 which leads to DOS. Another advantage is the ability of such filter to bridge between two buses 105 with different capabilities of handling messages pace. This type of filter 703 is quite simple to configure compared to other stateful filters and can handle many threats.

Proxy

Figure 21:
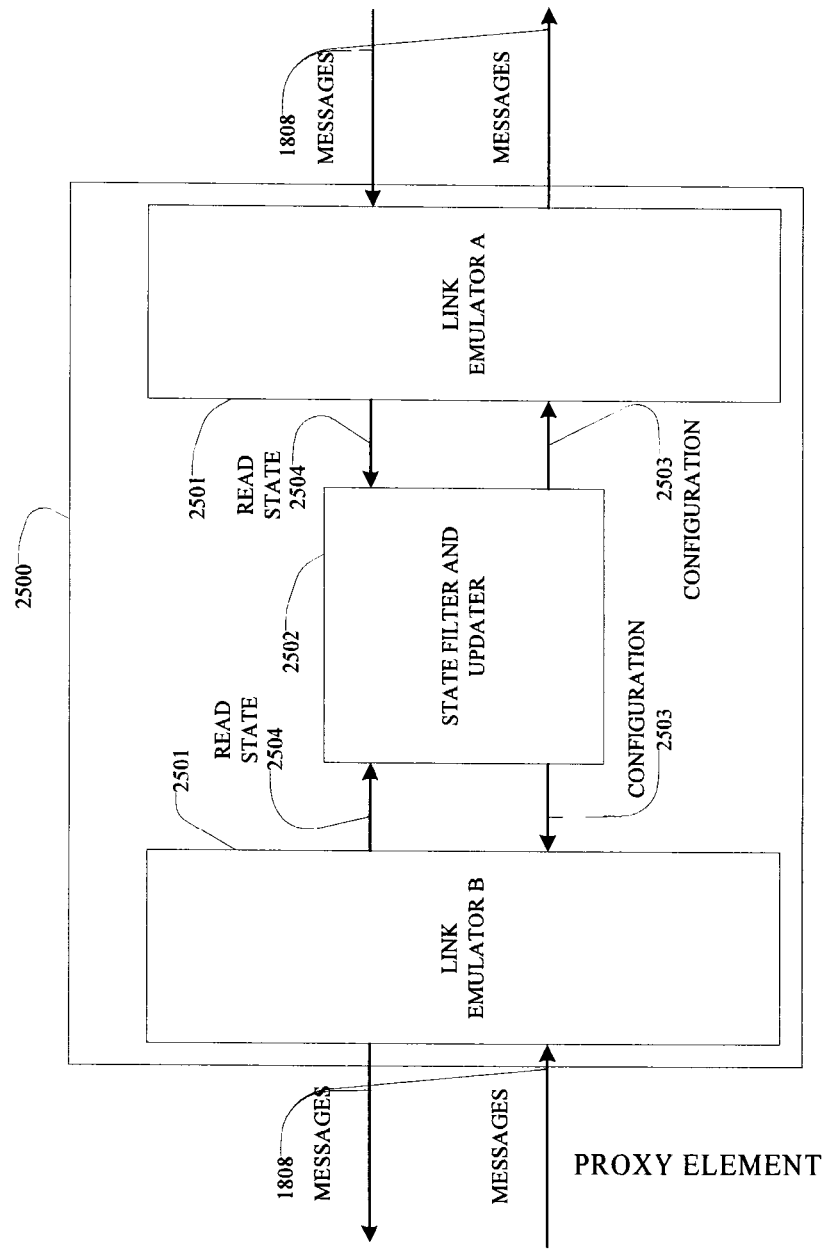
FIG. 21 is a block diagram illustration of one example of a proxy element (in the security system), according to an embodiment of the present invention.

FIG. 21 illustrates the proxy element 2500 design, according to some embodiments of the present invention. The proxy element 2500 is connected to one or more message handlers 1801 through interfaces 1808. Each proxy element 2500 is composed of link emulators (one for each interface) 2501, and one state filter and updater 2502. A proxy element 2500 emulates the operation of one bus 105 segment towards the other without allowing direct communication between the segments. All the messages transferred towards any segment using a proxy element 2500 are created by the proxy element 2500 using its state machines and rules (unlike a conventional filter that allows messages that are not blocked to pass).

In some embodiments, it is possible to use a proxy element 2500 connected only to one message handler 1801, in case there is a need to emulate a disconnected side as if it was connected. An example to such case can be assembling a radio which needs a connection to the vehicle without making the connection, by emulating such connection using a proxy element 2500.

Figure 22:
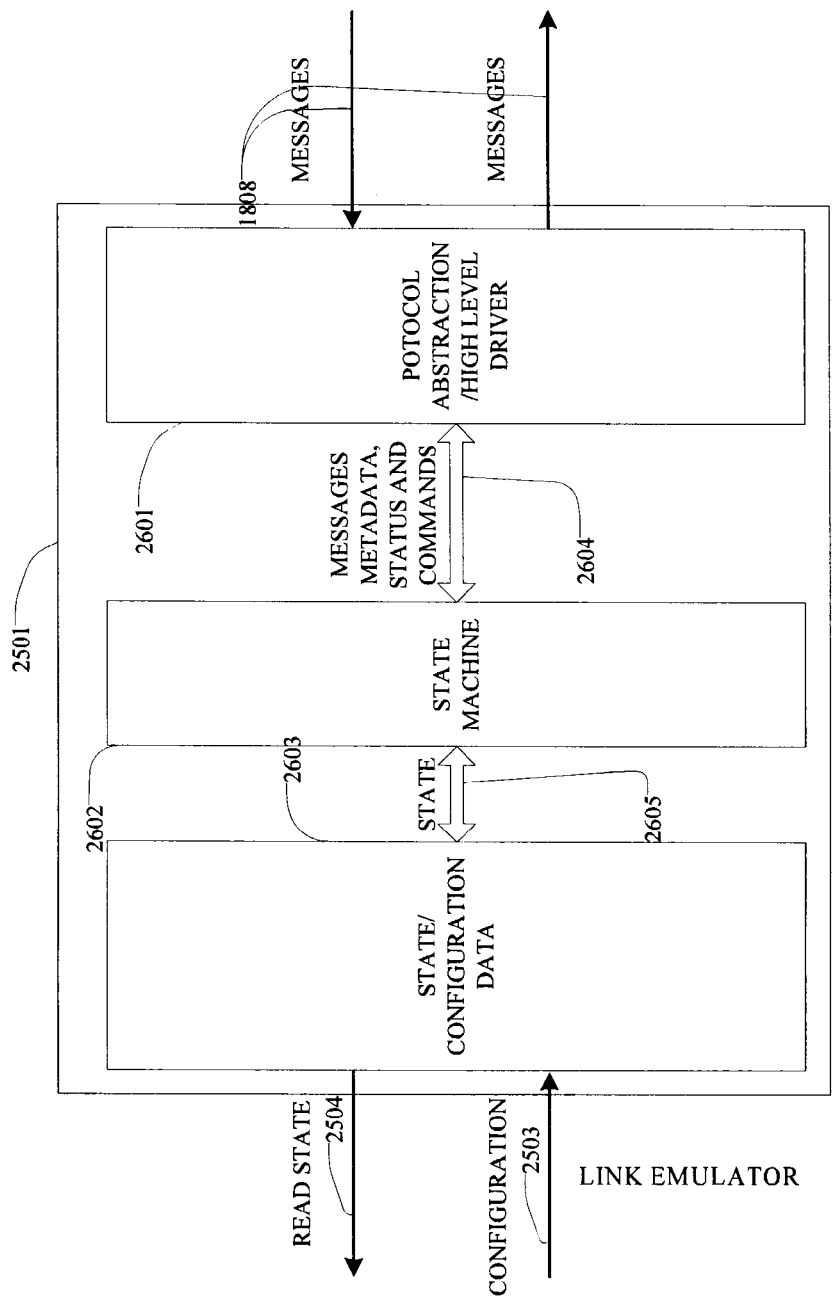
FIG. 22 is a block diagram illustration of one example of a link emulator such as Link emulator A of FIG. 21, according to an embodiment of the present invention.

FIG. 22 illustrates one embodiment of a Link Emulator 2501 which emulates a communication protocol between two or more participants toward the participants that are connected to its emulated side (e.g. if TCP is the protocol, the emulator will send Ack (Acknowledge) messages for each message received), according to some embodiments. The link emulator 2501 manages and saves a state of the communication (e.g. if TCP is the protocol, the emulator will save a window of the Acknowledged messages). The state that the link emulator stores may include any data and meta-data related to received and sent messages. The link emulator 2501 can update the state filter and updater passively or actively with its current state. The communication will be affected by the link emulator's state, the received messages and the time.

In some embodiments, the link emulator 2501 illustrated in FIG. 22 consists of a protocol abstraction layer/high level driver 2601, a state machine 2602 and state/configuration data module 2603. A protocol abstraction layer 2601 acts as an abstraction layer of the communication protocols the proxy element 2500 handles. It communicates in a relatively simple manner with the state machine 2602, by sending messages metadata, status and commands through interface 2604. The state machine 2602 implements the logic the link emulator 2501 includes. The logic the state machine 2602 implements includes, but is not limited to, updating the state, immediately responding to events etc. (e.g. upon receiving a TCP message it updates the window stored in 2603, changing the state and sends an Ack message through the protocol abstraction layer 2601). The state/configuration data module 2603 stores the current state of the link emulator 2501 and can be accessed both by the state machine 2602 and the state filter and updater 2502. The state machine 2602 and the state/configuration data 2603 modules communicate by sending states to each other through the state interface 2605.

In some embodiments, the state filter and updater 2502 reads the state from each link emulator 2501 using the read-state link 2504 passively or actively and according to the proxy logic it configures the state on each of the link emulators 2501 through the configuration link 2503. In some embodiments, messages are never directly transferred between link emulators 2501; the only communication between link emulators 2501 is by using a state update. The state filter 2502 will enable only legitimate states to pass between link emulators 2501.

In some embodiments, the logic of the proxy element 2500 is either hardcoded or configurable.

Existing conventional stateful filters have an internal state machine that tries to emulate the state of the transferred messages and when the state machine discovers an anomaly, messages are discarded. When the filter's state machine is different than the state machine used by the communicating parties an inconsistent state may occur between the filter and the communicating parties, allowing forbidden communication to pass (e.g. different TCP timeout configuration). In some embodiments, allowing only a state to pass between the link emulators and correctly designing the proxy, can solve the aforementioned problem.

A proxy application example according to some embodiments of the currently disclosed subject matter is now described:

A radio 112 often uses the vehicle's integrated display to display information (e.g. radio station frequency). The example assumes a normal radio-vehicle communication is between the radio and the display system. The display system sends its model type and repeatedly sends a keep-alive message. The radio 112 communicates with the display system, queries the model type and sends display data according to the display's capabilities.

Figure 23:
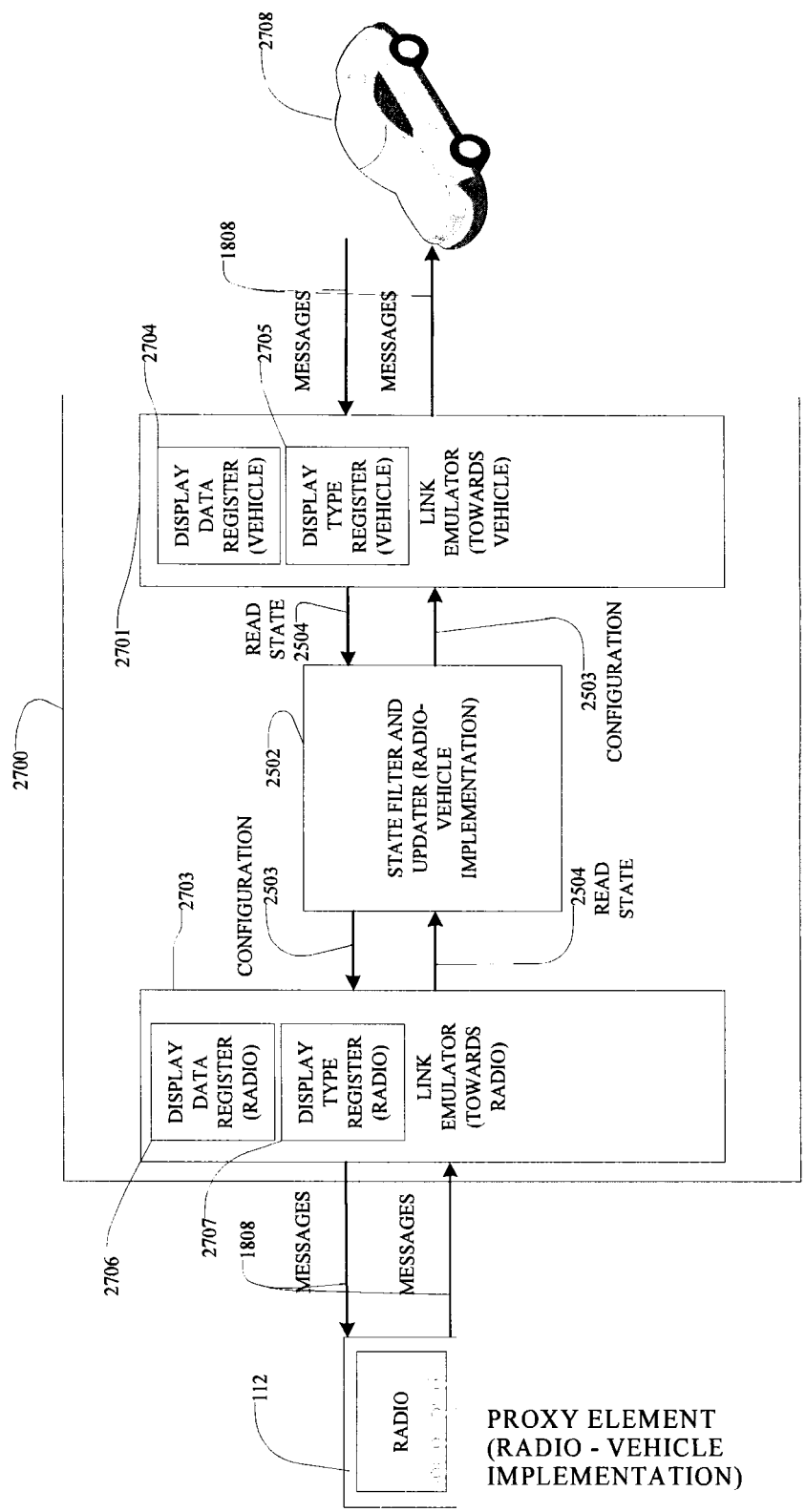
FIG. 23 is a block diagram illustration of one example of the proxy element illustrated in FIG. 21. This illustration exemplifies the use of a security system containing a proxy to protect a vehicle from attacks origination from the infotainment system, according to an embodiment of the present invention.

A proxy element application 2700, as seen in FIG. 23, consists of a link emulator 2701 towards the vehicle 2708, a link emulator 2703 toward the radio 112 and a state filter and updater 2502, according to some embodiments. The proxy element is only a part of the security system 703, which was omitted from the figure for the sake of clarity.

The link emulator 2701 towards the vehicle 2708 is connected between the vehicle 2708 and the state filter and updater 2502. It holds the formatted text (display data) 2704 designated for the display and the display type (state) 2705. At startup, this link emulator towards the vehicle 2701 queries the display system for its type, stores the information in 2705 and sends it to the state filter and updater 2502. The link emulator towards the vehicle 2701 is in operational mode if it holds a valid display data and a valid display type. When in operational mode the link emulator 2701 sends messages containing display data on every display data change according to the display type.

The link emulator towards the radio 2703 is connected between the radio 112 and the state filter and updater 2502. It contains the same type of registers as the link emulator toward the vehicle 2701. At startup, the link emulator 2703 waits to receive a display type from the state filter and updater. Once the link emulator 2703 has a valid display type in 2707 it responds to queries for the display type received from the radio. The link emulator 2703 sends repeated keep-alive messages to the radio. The link emulator 2703 stores the data from the display messages received from the radio in the display data register 2706. If the display data register 2706 is changed, the link emulator 2703 sends the new state to the state filter and updater 2502.

The state filter and updater 2502 receives the display type from the link emulator toward the vehicle 2701. If the display type is valid, the state filter and updater 2502 sends it to the link emulator towards the radio 2703. The state filter and updater 2502 receives the display data from the link emulator towards the radio 2703. If the display data is valid, it sends the data to the link emulator towards the vehicle 2701.

It must be understood that the rules 2102 described above are merely an example of possible types of rules 2102, and rules 2102 can also be any kind of other rules 2102, or any combination of them. There is a possibility to combine rules 2102 in a row, such that the output message of one rule 2102 will be sent as an input to the next rule 2102. A rule 2102 can also change the message properties, content, or any other data related to the message, before sending it to its output interface 2002. Any person skilled in the art and reading the current specification will immediately be able to advise different types and combination of rules 2102, and all these rules 2102 are encompassed by the present invention.

Critical ECUs with External Communication

Some previously described embodiments related to protecting safety critical ECUs 100 which do not have any external communication interfaces. However, in embodiments where safety critical ECUs 100 have external communication interface(s) the security system 703 can also be used to protect ECUs 75 as described in this section.

In some embodiments, safety critical ECUs 100 have an external communication interface (e.g. some vehicle to vehicle (V2V) communication ECU are able to command the vehicle to brake). Such an ECU could send critical messages (i.e. having effect on the vehicle's behavior) and non-critical messages (e.g. traffic information). The non-critical messages can be filtered in the same manner as described in previous sections.

In some embodiments, some ECUs responsible for safety 100 (e.g. Electronic stability control (ESC) 110 or Mobileye) have the ability to supervise messages arriving from the driver (e.g. an ESC ECU monitors the brake pedal and prevents skidding because of braking). Such an ECU 110 can supervise specific critical messages, and prevent harm caused by these messages. These messages are denoted by ECM (external critical messages).

In some embodiments, the security system 703 can allow the relevant ECM (i.e. ECM supported by the critical external ECU) to pass towards the vehicle's inner bus 105 as long as these messages are supervised effectively by a safety ECU. In this manner critical and potentially lifesaving critical messages are supported securely by the vehicles electronic system 101. Such a security system 703 can also be used in case there is no relevant safety ECU, but in such case it will be possible to attack the vehicle using the allowed critical messages.

In some embodiments where an ECU with an external communication has the ability to send critical messages to the communication bus 105, the driver should have the ability to manually override or disable the messages from this ECU.

MODBUS and Other Control Protocols

MODBUS is a protocol extensively used in industrial control systems. Similarly to CAN bus 105, it is a simple protocol used by controllers. Additionally, several other control protocols with similar characteristics exist such as FlexRay, VAN bus, LIN bus etc. The embodiments described above for CAN bus can be applicable for other communication protocols, such as MODBUS, mutatis mutandis.

In some embodiments, the main difference between the implementation of a filter and/or proxy 703 for CAN bus 105 and any other protocol is the physical layer and the specific filter logic. Different protocols have different message characteristics thus requiring different type of filtering (e.g. a MODBUS filter takes a special notice to the function code field). The proxy logic may be different but the proxy concept is the same: The link emulator 2501 has to handle communication with specific communication protocol (e.g. message handling and specific state machine 2602 for the protocol). The state filter and updater 2502 filters and updates the state as the CAN bus 105 proxy state filter and updater.

MODBUS is built as master-slave architecture, meaning there is one master and one or more slaves connected to the bus 105. The master can send a request (e.g. read or write data command) to one or more slaves, and the relevant slaves should act according to the request and send their response to the master over the bus 105.

In some embodiments, a proxy 703 protecting such communication bus 105 may save the sent request properties, and allow only the relevant response to pass towards the master (e.g. the request and response can be characterized by their function code).

In some embodiments, the said proxy 703 can also generate the received request and/or response by itself according to the messages it receives, and send the generated message instead of the original message.

In some embodiments, a proxy 703 may block requests originating from any components which should not function as the master on the bus.

Authentication Unit

In one embodiment of the present invention, the security system 703 also functions as an authentication unit. The authentication unit can be another module of the security system 703 of the invention.

The authentication unit of the invention is responsible for verifying that communication is performed with authentic counterparts inside or outside the vehicle's electronic system 101. Authentication units can be integrated with ECU's 75 and in particular with ECU's 75 that don't have an external communication interface. For better security, an authentication unit can be coupled to every safety critical ECU 110, every valuable ECU 75 and every ECU with an external communication interface 109.

The authentication unit can employ one or more mechanisms for authentication of a communication source or destination. In some embodiments, authentication units can be the source or destination of messages. These mechanisms are, for example, authentication of a source or destination element (that sends or receives messages); conditional transmission of messages based on a successful authentication; and signature and/or signature verification of messages.

In some embodiments, the authentication unit can also encrypt and/or decrypt messages. This type of encryption can be used for secrecy, integrity, authenticity etc.

Authentication—any authentication unit (stand-alone or coupled to or integrated with an ECU 905) can perform an authentication procedure with any other authentication unit (stand-alone or coupled to or integrated with an ECU 905). In some embodiments, a stand-alone authentication unit can be coupled with a bus 105. In some embodiments, a stand-alone authentication unit can be coupled with one or more ECU's 75. In some embodiments, the authentication unit is integrated with one ECU 905 (i.e. the authentication unit is included inside the ECU 905 as part of the security system 703). In some embodiments, the authentication unit is a stand-alone security system 703 that is not coupled with any ECU 75 when proving its existence itself is meaningful, for example, for proving that a general sub-system was provided by a valid supplier. In some embodiments, referring to authenticating an ECU 75 means authenticating the authentication unit coupled with it.

In some embodiments, each authentication unit is configured with a list of all the authentication units in the system 101 with which authentication is required. Each authentication unit can periodically initiate an authentication process with any other authentication unit. The period after which the authentication must be renewed can be fixed or variable per authentication unit. The authentication process can involve a challenge message from one authentication unit to another. The receiving authentication unit then responds to the challenge with a response (typically encrypted). The authentication unit that has sent the challenge message verifies the response and if correct, marks that authentication unit in the list as authenticated. If the response is not correct, the challenge may be repeated one or more times, after which that authentication unit will be marked in the list as unidentified (not authenticated).

The challenge and response messages flow between authentication units as regular messages in the vehicle electronic system. These messages are received by a receiving unit. The classification unit classifies them as challenge/response messages and sends them to the message analyzer unit which handles them.

The message analyzer unit is capable of initiating challenge messages when it is necessary to authenticate an ECU 75 before delivering a message to it or considering a message from it.

In some embodiments, the authentication process can also be initiated by an authentication unit, when the authentication unit or the ECU 75 to which it is coupled, are programmed to periodically authenticate ECU's 75 on its authentication list.

In some embodiments, the authentication process can be one-way or two-way. In a one-way authentication process, each authentication unit sends a challenge to the other. That is, authentication unit A challenges authentication unit B, and authentication unit B challenges authentication unit A. In a two-way authentication process, the challenge message sent by authentication unit A to authentication unit B is sufficient for authenticating authentication unit A, and authentication unit B does not need to issue its own challenge message to authentication unit A.

In some embodiments, the authentication process can be multi-way, that is authentication unit A broadcasts a challenge and/or response message that reaches a plurality of authentication units over one or more communication buses 105.

Conditional Message Transmission Based on Authentication— the message analyzer unit can be configured to transmit a message only if an authentication requirement is fulfilled. Examples of authentication requirements include but are not limited to: that the source authentication unit is authenticated; that the destination ECU 75 is authenticated; that any other ECU 75 (not source or destination) is authenticated; that any combination of ECU's 75 are authenticated etc. The authentication requirement can be against the source, destination or any other ECU 75.

When a message that requires authentication arrives to the message classification unit, the message is classified as requiring authentication against ECU X 75, and the message is sent to the message analyzer unit. The message analyzer unit verifies if ECU X 75 is authenticated. If ECU X 75 is authenticated, the message analyzer unit continues to process the message. If ECU X 75 is not authenticated, the message analyzer unit can decide either to discard the message or to issue a challenge message to ECU X 75 to see if it authenticates itself.

It should be emphasized that the authentication requirement does not have to involve necessarily the source or destination ECU 75. For example, when ECU 1 75 sends a message to ECU 2 75, it may be required that ECU 1 75 is authenticated with ECU 7 75 before the message can be transmitted to ECU 2 75.

Signature and Verification—

One of the actions that the message analyzer unit can perform relates to the signature of messages. When a message arrives with a signature, the analyzer unit can verify that signature is valid. The analyzer unit can also add a signature to a message before transferring it to the transmission unit.

Figure 24:
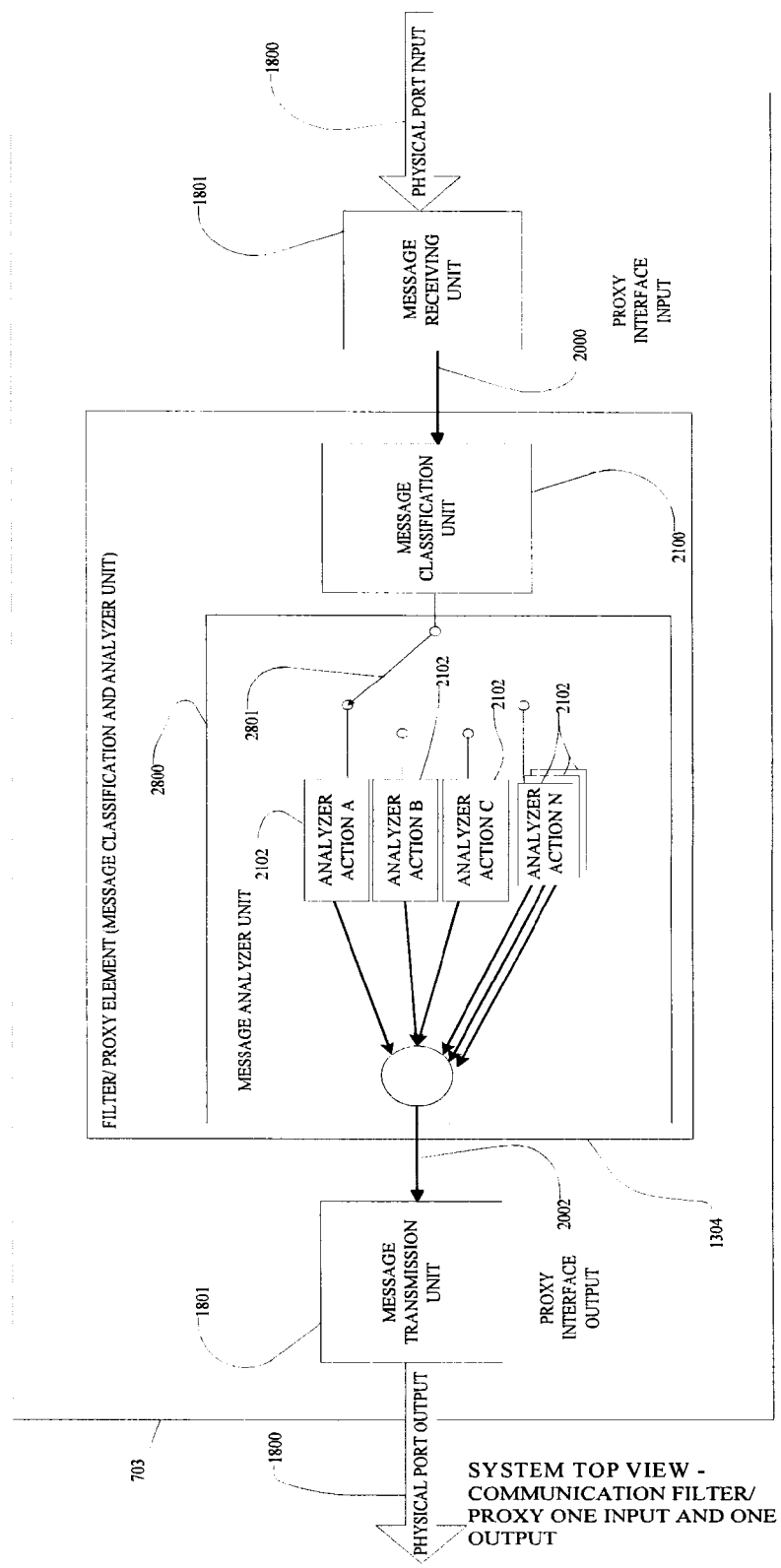
FIG. 24 is a block diagram illustrating one example of a security system of the invention consisting of one message receiving unit, one message classification unit, one message analyzer unit and one message transmission unit.

FIG. 24 illustrates a basic one way communication filter/proxy security system 703. A message received by the physical port input 1800 is inserted into the message receiving unit in message handler 1801. The message receiving unit transmits the message through the proxy interface input 2000 to the message classification unit (classifier) 2100 in the one way filter/proxy element 1304. The classifier 2100 classifies the message and sends the message and the message classification to the action selector 2801 in the message analyzer unit 2800, which chooses the proper action according to the classification. The message analyzer unit 2800 performs an action 2102 (without loss of generality) on the message according the classification and sends a message (if needed) through the proxy interface output 2002 to the message transmission unit 1801. The message transmission unit in the message handler 1801 transmits the message to the physical port output 1800.

Figure 25:
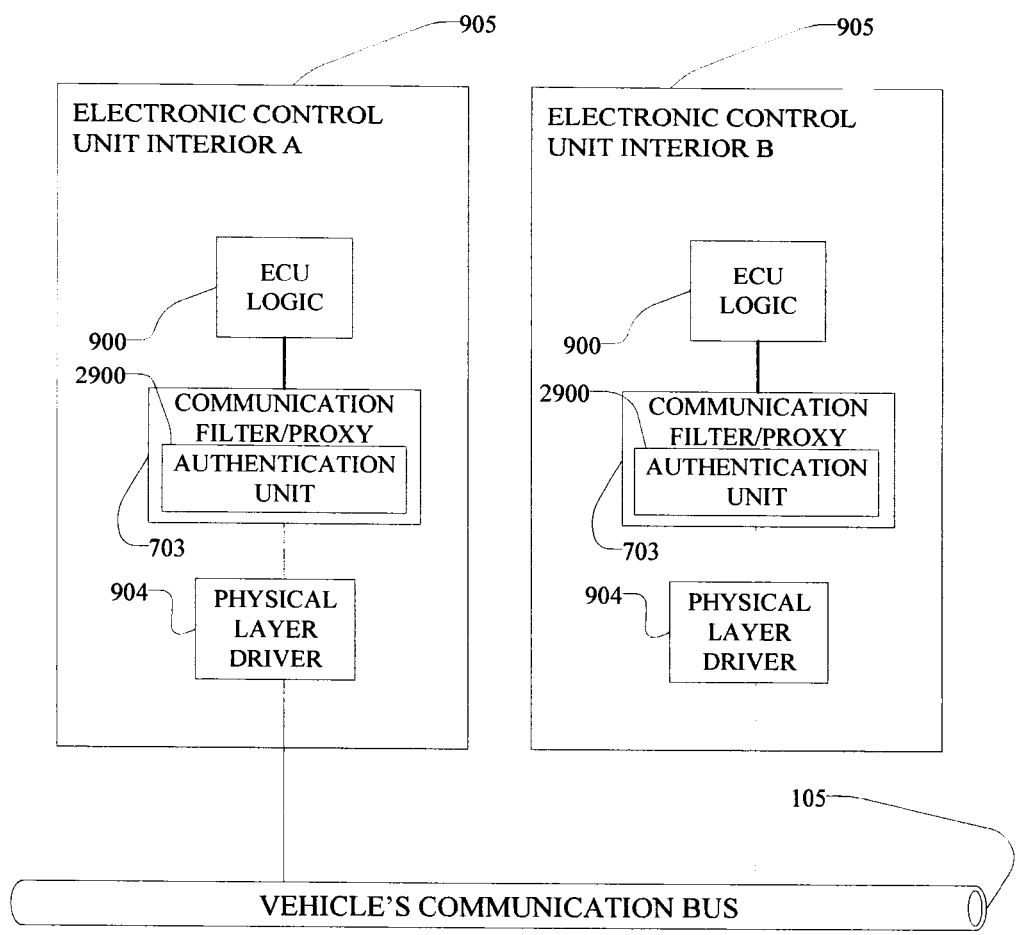
FIG. 25 illustrates an example of two ECUs with integrated security systems of the invention comprising authentication units, and connected on the same communication bus.

FIG. 25 illustrates one embodiment of the process of verifying/signing messages between communication filter/proxy (security systems) A and B 905. A message is sent by an ECU A logic 900 to a communication filter/proxy A 905 (containing rules for an authentication unit 2900, which illustrates the group of rules 2102 in charge of the authentication and signature processes). The ECU logic 900 is basically part of or all of the processing mechanisms of the ECU 905 except for the physical layer driver/transceiver 904 which is in charge of physically sending the communication signals to the outside world, which is a communication bus 105. The message arrives to the classification unit 2100 which classifies the message as "signature required against communication filter/proxy B" 905. The analyzer unit 2800 receives the message and proceeds to sign it against communication filter/proxy B 905. The signature process involves modifying the original message by adding a signature to it (in a predetermined format). The analyzer unit 2800 can further process the message (in addition to the signature) in accordance with the classification instructions received and general rules 2102 of the analyzer 2800. The analyzer unit 2800 will then send the message to the message transmission unit in the message handler 1801 which will send the message to its destination 904, which is a physical layer driver (port) of A.

The message will then arrive to its destination port 904 in ECU B 905, and will be transferred to the receiving unit in the message handler 1801 in communication filter/proxy B 703 and from there to the classification unit 2100. The classification unit 2100 classifies the message as requiring signature verification against communication filter/proxy A 703. When the analyzer unit 2800 receives the message, it verifies that the signature is authentic. If the signature is verified, the original message is extracted from the signed message and transferred to the relevant message transmission unit in the message handler 1801 which delivers the message to the logic 900 of B.

In some embodiments, if the signature verification has failed, the analyzer unit 2800 will ignore (discard) the message and no further action will be taken on the message. In some embodiments, the result of the signature verification will be logged.

There can be many implementations of adding and verifying a signature and they are all encompassed by the present invention. One such example can be: calculating a hash value on the content of the message data, and then encrypting the result using a shared key between the parties. The signature is done by adding the encrypted result to the message, and the verification is done by doing that process and comparing the result to the embedded sent signature. If both results are equal—the message's signature is valid.

In some embodiments, one or more communication filter/proxy security systems 703 of the invention can be implemented outside the vehicle computerized system 101.

In some embodiments, for efficiency considerations, the signature addition and/or verification does not need to occur with all messages, but only with messages that were classified as such by the classification unit.

The classification unit 2100 takes into consideration the format requirements of each message, including maximum allowed length, so that when adding a signature the message is still valid and can be transmitted and read properly. The system should be consistent with the protocol even when modifying messages. That means that not all messages will be signed for example if the signature will make the message size exceed the protocol's limit.

If, for example, ECUs A and B 75 exchange messages of different types and size, even if only one type of messages malfunctions, the entire system may malfunction, a situation that must be avoided. Accordingly, the classification unit 2100 is configured so that signed messages meet all the format requirements of regular (unsigned) messages, and thus can be transmitted and read correctly.

The invention claimed is:

1. An Electronic Control Unit (ECU) for exchanging messages with other ECUs in a vehicle over a vehicle communication bus under control of a data unit, each of the messages is composed of multiple parts, the ECU comprising in a single enclosure:

a first port;

a first transceiver coupled to the first port for transmitting messages to, and for receiving messages from, the first port;

a second physical port for connecting to the communication bus;

a second transceiver coupled to the second physical port for transmitting messages to, and for receiving messages from, the communication bus;

a third physical port for connecting to the data unit;

a third transceiver coupled to the third physical port for receiving from the data unit a rule associated with a part of the message;

a software and a processor for executing the software, the processor is coupled for controlling the first, second, and third transceivers;

a fourth physical port for connecting to an additional communication bus or to an additional ECU; and a fourth transceiver coupled to the fourth physical port for transmitting messages to, and for receiving messages from, the respective additional communication bus or the additional ECU, wherein the fourth transceiver is coupled to be controlled by the processor, wherein the ECU is operative to receive messages from the fourth physical port, and responsive to the rule received from the data unit via the third physical port, to pass, to block, or to change and then pass, the received messages to the communication bus via the second physical port, or to the first port, wherein the ECU is operative to receive messages from the first port, and responsive to the rule received from the data unit via the third physical port, to pass, to block, or to change and then pass, the received messages to the communication bus via the second physical port, and wherein the ECU is operative to receive messages from the communication bus via the second physical port, and responsive to the rule received from the data unit via the third physical port, to pass, to block, or to change and then pass, the received messages to the first port.

2. The ECU according to claim 1, further operative to receive, and to respond to, multiple rules from the data unit via the third physical port.

3. The ECU according to claim 1, wherein all the messages received from the first port and from the communication bus are associated with a property, and wherein each of the messages includes a value of the property, and wherein the rule identifies the property and one or more values, and a specific received message is passed, blocked, or changed and then passed, in response to a comparison of the specific message value to the one or more rule values.

4. The ECU according to claim 3, wherein the property corresponds to a message header, a message content, a message length, an identification (ID) of a message, a message destination, or any combination thereof.

5. The ECU according to claim 1, wherein all the messages received from the first port and from the communication bus are associated with a timing information, wherein the rule includes one or more timing values, and wherein a specific received message is passed, blocked, or changed and then passed, in response to a comparison of the specific message timing information to the one or more rule timing values.

6. The ECU according to claim 1, wherein the parts comprise a header, a source identification, a destination identification, or content, and the ECU is further operative to limit the rate of transmitting messages to the first port.

7. The ECU according to claim 6, further comprising a buffer coupled between the first and second transceivers for adapting between the messages incoming rate from the communication bus via the second physical port and the messages outgoing rate to the first port.

8. The ECU according to claim 1, wherein a message is transmitted to the first port only a pre-determined time interval after the previous message was transmitted.

9. The ECU according to claim 1, further operative to limit the rate of transmitting messages to the communication bus via the second physical port.

10. The ECU according to claim 9, further comprising a buffer coupled between the first and second transceivers, to adapt between the message incoming rate from the first port and the message outgoing rate to the communication bus via the second physical port.

11. The ECU according to claim 1, wherein a message is transmitted to the communication bus via the second physical port only a pre-determined time interval after the previous message was transmitted.

12. The ECU according to claim 1, further comprising a communication bus emulator coupled to the first transceiver for emulating the communication bus.

13. The ECU according to claim 12, further operative to emulate the communication bus to the ECU when the ECU is not connected to the communication bus.

14. The ECU according to claim 12, wherein the communication via the first port is based on, uses, or is according to a protocol, and wherein the communication bus emulator comprises a high-level driver and is operative for protocol abstraction.

15. The ECU according to claim 14, wherein the communication bus emulator is operative to continuously transmit 'keep-alive' messages to the first port.

16. The ECU according to claim 1, further comprising a non-volatile memory in the single enclosure coupled to the third transceiver for storing the rule.

17. The ECU according to claim 16, wherein the non-volatile memory is Flash based.

18. The ECU according to claim 16, further operative to fetch the rule from the non-volatile memory, and to pass, to block, or to change and then pass, the received message in response to the fetched rule.

19. The ECU according to claim 1, wherein the communication with the data unit is based on, or using, serial communication, and wherein the third physical port is a serial physical port connection and the third transceiver is a serial data transceiver.

20. The ECU according to claim 19, wherein the serial data transceiver comprises a Universal Asynchronous Receiver Transmitter (UART).

21. The ECU according to claim 19, wherein the serial communication is based on, or using, RS-232.

22. The ECU according to claim 1, further operative to receive a message from the first port or from the communication bus via the second physical port, and to pass the message to the data unit via the third physical port.

23. The ECU according to claim 1, further operative for being inspected, controlled, or debugged by the data unit when connected to the data unit via the third physical port.

24. The ECU according to claim 1, wherein the ECU is operative to, responsive to the rule received from the data unit via the third physical port, to pass, to block, or to change and then pass, transmit messages received from the first port or from the communication bus via the second physical port, to an additional communication bus or to an additional ECU via the fourth physical port.

25. The ECU according to claim 1, further operative to append a signature to part of, or all of, the messages received from the first port, and to transmit the signed messages to the communication bus via the second physical port, or is operative to append a signature to part of, or all of, the messages received from the communication bus via the second physical port, and to transmit the signed messages to the first port.

26. The ECU according to claim 25, further operative to calculate a hash value of the content of the part of, or all of, the messages, and wherein the added signature is based on, or according to, the calculated hash value.

27. The ECU according to claim 25, further operative to encrypt the content of the part of, or all of, the messages, and wherein the added signature is based on, or according to, the encrypted content.

28. The ECU according to claim 27, wherein the encryption is based on, or uses, a key.

29. The ECU according to claim 28, for use with messages originated by a source ECU to be sent to a destination ECU, wherein the ECU serves as the source or destination ECU, and wherein the key is shared between the source and destination ECUs.

30. The ECU according to claim 1, wherein the part of, or all of, the messages include a signature, and wherein the ECU is further operative to verify the signature.

31. The ECU according to claim 30, wherein the verification comprises calculating a hash value or encrypting the content of the part of, or all of, the messages, and respectively comparing the hash value or the encrypted content to the signature.

32. The ECU according to claim 30, further operative to pass, to block, or to change and then pass, the messages in response to the signature verification.

33. The ECU according to claim 1, further comprising a buffer coupled to the first transceiver for temporarily storing messages received via the first port.

34. The ECU according to claim 1, further comprising a buffer coupled to the second transceiver for temporarily storing messages received via the second physical port.

35. The ECU according to claim 1, further comprising a buffer coupled to the first transceiver for temporarily storing messages to be transmitted via the first port.

36. The ECU according to claim 1, further comprising a buffer coupled to the second transceiver for temporarily storing messages to be transmitted via the second physical port.

37. The ECU according to claim 1, wherein the first transceiver or the software comprises a physical layer driver adapted to transmit or receive messages respectively to or from the first port.

38. The ECU according to claim 1, wherein the second transceiver or the software comprises a physical layer driver adapted to transmit or receive messages respectively to or from the communication bus.

39. The ECU according to claim 1, further operative to save messages received from the first port or from the communication bus via the second physical port.

40. The ECU according to claim 1, further operative to derive and log statistics associated with the messages received from the first port or from the communication bus via the second physical port.

41. The ECU according to claim 1, further comprising a filter coupled between the first and second transceivers for passing messages therebetween.

42. The ECU according to claim 41, wherein the filter is part of, or comprises, the software, the processor, or any combination thereof.

43. The ECU according to claim 1, wherein the communication bus is according to a first protocol and wherein the ECU is further connectable to an additional communication bus that uses a second protocol, and wherein the ECU is operative to convert between the first and second protocols.

44. The ECU according to claim 1, for use with an authentication scheme that uses a message pair consisting of a challenge message and a challenge response message, wherein the ECU is operative to determine one of the other ECUs as authenticated based on using the authentication scheme.

45. The ECU according to claim 44, further operative to transmit to the first port the challenge message, and to receive a response from the first port.

46. The ECU according to claim 45, further operative to compare the received response from other ECU to the challenge response message, and upon verifying that the received response is identical to the challenge response message, determining that the other ECU as authenticated.

47. The ECU according to claim 44, further operative to receive from the first port the challenge message, and in response to transmit to the first port the challenge response message.

48. The ECU according to claim 44, further operative to responsive to the determining of the other ECU as authenticated, to pass, to block, or to change and then pass, the received messages to the communication bus via the second physical port.

49. The ECU according to claim 44, further operative to responsive to the determining of the other ECU as authenticated, to pass, to block, or to change and then pass, the received messages to the first port.

50. The ECU according to claim 1, for use with a plurality of ECUs coupled to transmit messages to, and receive messages from, the communication bus, and for use with an authentication scheme that uses a message pair consisting of a challenge message and a challenge response message, wherein the ECU is operative to select a first ECU selected from the plurality of ECUs and to determine the first ECU as authenticated based on using the authentication scheme.

51. The ECU according to claim 50, further operative to transmit to the first ECU via the second physical port the challenge message, and to receive a response from the first ECU via the second physical port.

52. The ECU according to claim 51, further operative to compare the received response from the first ECU to the challenge response message, and upon verifying that the received response is identical to the challenge response message, determining the first ECU as authenticated.

53. The ECU according to claim 50, further operative to receive from the first ECU via the second physical port the challenge message, and in response to transmit to the first ECU via the second physical port the challenge response message.

54. The ECU according to claim 50, wherein each of the messages includes identification of the source or destination ECU, and wherein the ECU is further operative to responsive to the determining of the first ECU as authenticated, to pass, to block, or to change and then pass, the received messages that include the first ECU as a source or destination.

55. The ECU according to claim 1, wherein the vehicle communication bus uses, or is compatible with, a multi-master, serial protocol using acknowledgement, arbitration, and error-detection schemes.

56. The ECU according to claim 55, wherein the vehicle communication bus employs, uses, is based on, or is compatible with, a synchronous and frame-based protocol.

57. The ECU according to claim 56, wherein the vehicle communication bus employs, uses, is based on, or is compatible with, a Controller Area Network (CAN).

58. The ECU according to claim 55, wherein the vehicle communication bus employs, uses, is based on, or is compatible with, a Local Interconnect Network (LIN), FlexRay protocol, or Vehicle Area Network (VAN) bus.

59. The ECU according to claim 1, wherein the vehicle communication bus is based on, uses, or is compatible with, MOD-BUS, MIL-STD-1553, or MIL-STD-1773 (ARINC).

60. The ECU according to claim 1, further comprising, or consisting of, an Engine Control Unit (EcU), immobilizer, or antitheft unit.

61. The ECU according to claim 1, further comprising, or consisting of, a safety critical ECU.

62. The ECU according to claim 61, further comprising, or consisting of, an Engine Control Unit (EcU), a Transmission Control Unit (TCU), Anti-Lock Braking System (ABS), Electronic Stability Control (ESC), or a brake control module.

63. The ECU according to claim 1, further comprising, consisting of, or is connectable to, an infotainment system, wireless tire pressure sensor (TPMS), Course Computer Unit (CCU), or telematics unit.

64. The ECU according to claim 1, further coupleable or connectable to receive data from a unit that is external to the vehicle.

65. The ECU according to claim 64, further wirelessly coupleable to receive data from the unit that is external to the vehicle.

66. The ECU according to claim 64, further wirelessly coupleable to receive radio or a Radio Data System (RDS) or to receive via cellular communication.

67. The ECU according to claim 1, further operative to encrypt part of, or whole of, the content of the part of, or all of, the messages that are transmitted via the first, second, or third ports.

68. A vehicle comprising the vehicle communication bus and the Electronic Control Unit (ECU) according to claim 1 connected thereto.

69. The vehicle according to claim 68, wherein the vehicle comprises, or consists of, a car, a truck, a motorcycle, a train, a tank, an airplane, a missile, a spaceship, a rocket, or a robot.

70. The vehicle according to claim 68, further operative for Vehicle-to-Vehicle (V2V) or Vehicle-to-Infrastructure (V2I) communication.

\* \* \* \* \*